US008725845B2

(12) United States Patent
Moorer et al.

(10) Patent No.: US 8,725,845 B2
(45) Date of Patent: May 13, 2014

(54) AUTOMATION CONTROL SYSTEM HAVING A CONFIGURATION TOOL

(75) Inventors: Seale Moorer, Westerville, OH (US); Eric Eichensehr, Westerville, OH (US)

(73) Assignee: Exceptional Innovation LLC, Westerville, OH (US)

( * ) Notice: Subject to any disclaimer, the term of this patent is extended or adjusted under 35 U.S.C. 154(b) by 551 days.

(21) Appl. No.: 11/686,875

(22) Filed: Mar. 15, 2007

(65) Prior Publication Data

US 2007/0260713 A1 Nov. 8, 2007

Related U.S. Application Data

(60) Provisional application No. 60/782,734, filed on Mar. 16, 2006, provisional application No. 60/782,596, filed on Mar. 16, 2006, provisional application No. 60/782,598, filed on Mar. 16, 2006, provisional application No. 60/782,635, filed on Mar. 16, 2006, provisional application No. 60/782,599, filed on Mar. 16, 2006, provisional application No. 60/782,600, filed on Mar. 16, 2006, provisional application No. 60/782,634, filed on Mar. 16, 2006, provisional application No. 60/782,595, filed on Mar. 16, 2006, provisional application No. 60/785,275, filed on Mar. 24, 2006, provisional application No. 60/793,257, filed on Apr. 20, 2006, provisional application No. 60/747,726, filed on May 19, 2006, provisional application No. 60/746,287, filed on May 3, 2006, provisional application No. 60/786,119, filed on Mar. 27, 2006, provisional application No. 60/857,774, filed on Nov. 9, 2006.

(51) Int. Cl.
*G06F 15/177* (2006.01)

(52) U.S. Cl.
USPC .......................................... 709/220; 370/466

(58) Field of Classification Search
USPC ......... 709/220–224, 227–228, 230, 246, 249; 710/104–106; 713/1, 100; 370/252, 370/254, 465–466; 341/50–51
See application file for complete search history.

(56) References Cited

U.S. PATENT DOCUMENTS

| | | |
|---|---|---|
| 4,567,557 A | 1/1986 | Burns |
| 4,808,841 A | 2/1989 | Ito et al. |
| 4,989,081 A | 1/1991 | Miyagawa et al. |
| 5,086,385 A | 2/1992 | Launey et al. |
| 5,105,186 A | 4/1992 | May |
| 5,218,552 A | 6/1993 | Stirk |
| 5,237,305 A | 8/1993 | Ishijuro |
| 5,282,028 A | 1/1994 | Johnson et al. |
| 5,502,618 A | 3/1996 | Chiou |
| 5,565,894 A | 10/1996 | Bates et al. |

(Continued)

OTHER PUBLICATIONS

Fred Halsall; Data Communications, Computer Networks and Open Systems; 1996; Addison-Wesley Publishers Ltd.; Fourth Edition; pp. 15, 18.

*Primary Examiner* — Saleh Najjar
*Assistant Examiner* — Eric W Shepperd
(74) *Attorney, Agent, or Firm* — Baker & Hostetler LLP

(57) ABSTRACT

A convergence and automation system (CAS) includes an internet protocol based network, hardware connected to the network, implemented with a web service for devices (WSD) protocol and including a plurality of devices, wherein each device is configured to perform at least one service, and a configuration tool to configure the CAS, to control hardware, and to converge and automate the services from the devices.

16 Claims, 18 Drawing Sheets

(56) References Cited

U.S. PATENT DOCUMENTS

| | | | |
|---|---|---|---|
| 5,579,221 A | 11/1996 | Mun | |
| 5,598,523 A | 1/1997 | Fujita | |
| 5,621,662 A * | 4/1997 | Humphries et al. | 700/276 |
| 5,623,392 A | 4/1997 | Ma | |
| 5,666,172 A | 9/1997 | Ida et al. | |
| 5,706,191 A | 1/1998 | Bassett et al. | |
| 5,706,290 A | 1/1998 | Shaw et al. | |
| 5,748,444 A | 5/1998 | Honda et al. | |
| 5,787,259 A | 7/1998 | Haroun | |
| 5,831,823 A | 11/1998 | Hoedl | |
| 5,850,340 A | 12/1998 | York | |
| 5,877,957 A | 3/1999 | Bennett | |
| 5,922,047 A | 7/1999 | Newlin et al. | |
| 5,956,025 A | 9/1999 | Goulden et al. | |
| 6,020,881 A | 2/2000 | Naughton et al. | |
| 6,029,092 A | 2/2000 | Stein | |
| 6,061,602 A | 5/2000 | Meyer | |
| 6,112,127 A | 8/2000 | Bennett | |
| 6,139,177 A | 10/2000 | Venkatraman et al. | |
| 6,147,601 A | 11/2000 | Sandelman et al. | |
| 6,154,681 A | 11/2000 | Drees et al. | |
| 6,160,477 A | 12/2000 | Sandelman et al. | |
| 6,175,872 B1 | 1/2001 | Neumann et al. | |
| 6,182,094 B1 | 1/2001 | Humpleman et al. | |
| 6,192,282 B1 | 2/2001 | Smith et al. | |
| 6,198,479 B1 | 3/2001 | Humpleman et al. | |
| 6,201,523 B1 | 3/2001 | Akiyama et al. | |
| 6,222,729 B1 | 4/2001 | Yoshikawa | |
| 6,243,707 B1 | 6/2001 | Humpleman et al. | |
| 6,263,260 B1 | 7/2001 | Bodmer et al. | |
| 6,268,857 B1 | 7/2001 | Fishkin et al. | |
| 6,275,922 B1 | 8/2001 | Bertsch | |
| 6,278,676 B1 | 8/2001 | Anderson et al. | |
| 6,288,716 B1 | 9/2001 | Humpleman et al. | |
| 6,313,990 B1 | 11/2001 | Cheon | |
| 6,314,326 B1 | 11/2001 | Fuchu | |
| 6,353,853 B1 | 3/2002 | Gravlin | |
| 6,385,495 B1 | 5/2002 | Bennett | |
| 6,389,331 B1 | 5/2002 | Jensen et al. | |
| 6,402,109 B1 | 6/2002 | Dittmer | |
| 6,405,103 B1 | 6/2002 | Ryan et al. | |
| 6,456,892 B1 | 9/2002 | Dara-Abrams et al. | |
| 6,462,654 B1 | 10/2002 | Sandelman et al. | |
| 6,473,661 B1 | 10/2002 | Wollner | |
| 6,496,575 B1 | 12/2002 | Vasell et al. | |
| 6,522,346 B1 | 2/2003 | Meyer | |
| 6,523,696 B1 | 2/2003 | Saito et al. | |
| 6,526,581 B1 | 2/2003 | Edson | |
| 6,546,419 B1 | 4/2003 | Humpleman | |
| 6,580,950 B1 | 6/2003 | Johnson et al. | |
| 6,587,739 B1 | 7/2003 | Abrams et al. | |
| 6,609,038 B1 | 8/2003 | Croswell et al. | |
| 6,615,088 B1 | 9/2003 | Myer et al. | |
| 6,633,781 B1 | 10/2003 | Lee et al. | |
| 6,640,141 B2 | 10/2003 | Bennett | |
| 6,663,781 B1 | 12/2003 | Huling | |
| 6,690,411 B2 | 2/2004 | Naidoo et al. | |
| 6,690,979 B1 | 2/2004 | Smith | |
| 6,735,619 B1 | 5/2004 | Sawada | |
| 6,756,998 B1 | 6/2004 | Bilger | |
| 6,763,040 B1 | 7/2004 | Hite et al. | |
| 6,778,868 B2 | 8/2004 | Imamura et al. | |
| 6,782,294 B2 | 8/2004 | Reich et al. | |
| 6,792,319 B1 | 9/2004 | Bilger | |
| 6,792,323 B2 | 9/2004 | Krzyzanowski et al. | |
| 6,792,480 B2 | 9/2004 | Chaiken et al. | |
| 6,823,223 B2 | 11/2004 | Gonzales et al. | |
| 6,834,208 B2 | 12/2004 | Gonzales et al. | |
| 6,838,978 B2 | 1/2005 | Aizu et al. | |
| 6,845,275 B2 | 1/2005 | Gasiorek et al. | |
| 6,850,149 B2 | 2/2005 | Park | |
| 6,859,669 B2 | 2/2005 | An | |
| 6,865,428 B2 | 3/2005 | Gonzales et al. | |
| 6,868,292 B2 | 3/2005 | Ficco | |
| 6,868,293 B1 | 3/2005 | Schurr et al. | |
| 6,870,555 B2 | 3/2005 | Sekiguchi | |
| 6,891,838 B1 | 5/2005 | Petite et al. | |
| 6,912,429 B1 | 6/2005 | Bilger | |
| 6,924,727 B2 | 8/2005 | Nagaoka et al. | |
| 6,928,576 B2 | 8/2005 | Sekiguchi | |
| 6,930,599 B2 | 8/2005 | Naidoo et al. | |
| 6,957,110 B2 | 10/2005 | Wewalaarachchi et al. | |
| 6,957,275 B1 | 10/2005 | Sekiguchi | |
| 6,961,763 B1 | 11/2005 | Wang et al. | |
| 6,965,935 B2 | 11/2005 | Diong | |
| 6,967,565 B2 | 11/2005 | Lingermann | |
| 6,980,868 B2 | 12/2005 | Huang et al. | |
| 6,990,379 B2 | 1/2006 | Gonzales et al. | |
| 7,047,092 B2 | 5/2006 | Wimsatt | |
| 7,170,422 B2 | 1/2007 | Nelson et al. | |
| 7,201,356 B2 | 4/2007 | Huang | |
| 7,203,486 B2 | 4/2007 | Patel | |
| 7,337,217 B2 * | 2/2008 | Wang | 709/217 |
| 7,380,250 B2 | 5/2008 | Schechter et al. | |
| 7,453,685 B2 | 11/2008 | Lube | |
| 7,870,188 B2 * | 1/2011 | Mazzitelli et al. | 709/203 |
| 8,037,538 B2 * | 10/2011 | Baba et al. | 726/27 |
| 2001/0034754 A1 | 10/2001 | Elwahab et al. | |
| 2001/0036192 A1 | 11/2001 | Chiles et al. | |
| 2001/0039460 A1 | 11/2001 | Aisa | |
| 2002/0000092 A1 | 1/2002 | Sharood et al. | |
| 2002/0016639 A1 | 2/2002 | Smith et al. | |
| 2002/0029085 A1 | 3/2002 | Park | |
| 2002/0029263 A1 * | 3/2002 | Toyoshima et al. | 709/223 |
| 2002/0031120 A1 | 3/2002 | Rakib | |
| 2002/0033760 A1 | 3/2002 | Kobayashi | |
| 2002/0035404 A1 | 3/2002 | Ficco et al. | |
| 2002/0044042 A1 | 4/2002 | Christensen | |
| 2002/0047774 A1 | 4/2002 | Christensen | |
| 2002/0111698 A1 | 8/2002 | Graziano et al. | |
| 2002/0126443 A1 | 9/2002 | Zodnik | |
| 2002/0152311 A1 | 10/2002 | Veltman et al. | |
| 2002/0165953 A1 | 11/2002 | Diong | |
| 2002/0174178 A1 * | 11/2002 | Stawikowski | 709/203 |
| 2002/0180579 A1 | 12/2002 | Nagaoka et al. | |
| 2002/0194328 A1 | 12/2002 | Hallenbeck | |
| 2002/0196158 A1 | 12/2002 | Lee | |
| 2003/0009515 A1 | 1/2003 | Lee et al. | |
| 2003/0028270 A1 | 2/2003 | Peterson et al. | |
| 2003/0033028 A1 | 2/2003 | Bennett | |
| 2003/0034898 A1 | 2/2003 | Shamoon et al. | |
| 2003/0037166 A1 | 2/2003 | Ueno et al. | |
| 2003/0040812 A1 | 2/2003 | Gonzales et al. | |
| 2003/0040813 A1 | 2/2003 | Gonzales et al. | |
| 2003/0040819 A1 | 2/2003 | Gonzales | |
| 2003/0065407 A1 | 4/2003 | Johnson et al. | |
| 2003/0074088 A1 | 4/2003 | Gonzales | |
| 2003/0083758 A1 | 5/2003 | Williamson | |
| 2003/0101304 A1 | 5/2003 | King et al. | |
| 2003/0103088 A1 | 6/2003 | Dresti et al. | |
| 2003/0198938 A1 | 10/2003 | Murray | |
| 2003/0200009 A1 | 10/2003 | von Kannewurff | |
| 2004/0003051 A1 | 1/2004 | Krzyzanowski et al. | |
| 2004/0004810 A1 | 1/2004 | Kim | |
| 2004/0010327 A1 | 1/2004 | Terashima et al. | |
| 2004/0010561 A1 | 1/2004 | Kim | |
| 2004/0030740 A1 * | 2/2004 | Stelting | 709/201 |
| 2004/0039459 A1 | 2/2004 | Daugherty et al. | |
| 2004/0092282 A1 | 5/2004 | Kim et al. | |
| 2004/0133314 A1 | 7/2004 | Ehlers | |
| 2004/0138768 A1 | 7/2004 | Murray | |
| 2004/0143629 A1 | 7/2004 | Bodin et al. | |
| 2004/0176877 A1 | 9/2004 | Hesse | |
| 2004/0205765 A1 * | 10/2004 | Beringer et al. | 719/311 |
| 2004/0205766 A1 * | 10/2004 | Lee et al. | 719/311 |
| 2004/0213384 A1 | 10/2004 | Alles | |
| 2004/0215694 A1 | 10/2004 | Podolsky | |
| 2004/0215778 A1 | 10/2004 | Hesse et al. | |
| 2004/0215816 A1 | 10/2004 | Hayes et al. | |
| 2004/0237107 A1 | 11/2004 | Staples | |
| 2004/0243257 A1 | 12/2004 | Theimer | |
| 2004/0249922 A1 | 12/2004 | Hackman | |
| 2004/0250137 A1 * | 12/2004 | Takahashi | 713/201 |
| 2004/0260407 A1 | 12/2004 | Wimsatt | |

(56) References Cited

U.S. PATENT DOCUMENTS

| | | |
|---|---|---|
| 2004/0260427 A1 | 12/2004 | Wimsatt |
| 2004/0267385 A1 | 12/2004 | Lingemann |
| 2004/0267876 A1 | 12/2004 | Kakivaya et al. |
| 2004/0267909 A1 | 12/2004 | Autret |
| 2005/0009498 A1 | 1/2005 | Ho |
| 2005/0021805 A1 | 1/2005 | DePetris |
| 2005/0035717 A1 | 2/2005 | Adamson |
| 2005/0038708 A1 | 2/2005 | Wu |
| 2005/0055108 A1 | 3/2005 | Gonzales |
| 2005/0071419 A1 | 3/2005 | Lewontin |
| 2005/0080879 A1 | 4/2005 | Kim et al. |
| 2005/0085930 A1 | 4/2005 | Gonzales |
| 2005/0090915 A1 | 4/2005 | Geiwitz |
| 2005/0096753 A1 | 5/2005 | Arling et al. |
| 2005/0097178 A1* | 5/2005 | Bala ..................... 709/207 |
| 2005/0107897 A1 | 5/2005 | Callaghan |
| 2005/0108091 A1* | 5/2005 | Sotak et al. ............... 705/14 |
| 2005/0113021 A1 | 5/2005 | Gosieski, Jr. et al. |
| 2005/0113943 A1 | 5/2005 | Nian |
| 2005/0119767 A1 | 6/2005 | Kiwimagi et al. |
| 2005/0119793 A1 | 6/2005 | Amundson et al. |
| 2005/0125083 A1 | 6/2005 | Kiko |
| 2005/0131551 A1 | 6/2005 | Ruutu |
| 2005/0131553 A1 | 6/2005 | Yoon et al. |
| 2005/0131558 A1 | 6/2005 | Braithwaite |
| 2005/0132405 A1 | 6/2005 | AbiEzzi |
| 2005/0149758 A1 | 7/2005 | Park |
| 2005/0159823 A1* | 7/2005 | Hayes et al. ............... 700/19 |
| 2005/0198063 A1 | 9/2005 | Thomas et al. |
| 2005/0198188 A1 | 9/2005 | Hickman |
| 2005/0198304 A1 | 9/2005 | Oliver et al. |
| 2005/0232583 A1* | 10/2005 | Kubota ..................... 386/46 |
| 2005/0262227 A1 | 11/2005 | Heller et al. |
| 2005/0267605 A1 | 12/2005 | Lee et al. |
| 2005/0271355 A1 | 12/2005 | Gilor |
| 2006/0004920 A1 | 1/2006 | Hallenbeck |
| 2006/0009861 A1 | 1/2006 | Bonasia et al. |
| 2006/0020353 A1 | 1/2006 | Gonzales et al. |
| 2006/0053234 A1 | 3/2006 | Kumar et al. |
| 2006/0058900 A1 | 3/2006 | Johanson et al. |
| 2006/0069934 A1 | 3/2006 | Esch et al. |
| 2006/0106933 A1 | 5/2006 | Huang et al. |
| 2006/0118694 A1 | 6/2006 | Lee et al. |
| 2006/0126646 A1 | 6/2006 | Bedingfield, Sr. |
| 2006/0155802 A1 | 7/2006 | He et al. |
| 2007/0053376 A1 | 3/2007 | Oshima et al. |
| 2007/0083679 A1 | 4/2007 | Kikuchi |
| 2007/0104332 A1 | 5/2007 | Clemens et al. |
| 2007/0153459 A1 | 7/2007 | Wohlford et al. |
| 2007/0162567 A1 | 7/2007 | Ding |
| 2007/0247800 A1 | 10/2007 | Smith et al. |
| 2008/0108439 A1 | 5/2008 | Cole |

* cited by examiner

AUTOMATION CONTROL SYSTEM HAVING A CONFIGURATION TOOL

CROSS REFERENCE TO RELATED APPLICATION

This application claims priority to and the benefit of: Provisional Patent Application No. 60/782,734 filed on Mar. 16, 2006, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTIONS, AND EVENTING THAT IS CONTROLLABLE WITH A TOUCH-SCREEN DISPLAY, to Seale MOORER et al.; Provisional Patent Application No. 60/782,596 filed on Mar. 16, 2006, entitled AUTOMATION CONTROL SYSTEM HAVING DIGITAL MEDIA STREAMING, to Seale MOORER et al.; Provisional Patent Application No. 60/782,598 filed on Mar. 16, 2006, entitled AUTOMATION CONTROL SYSTEM HAVING DIGITAL LOGGING, to Seale MOORER et al.; Provisional Patent Application No. 60/782,635 filed on Mar. 16, 2006, entitled AUTOMATION CONTROL SYSTEM HAVING A CONTROL PANEL, to Seale MOORER et al.; Provisional Patent Application No. 60/782,599 filed on Mar. 16, 2006, entitled AUTOMATION CONTROL SYSTEM HAVING A CONFIGURATION TOOL, to Seale MOORER et al.; Provisional Patent Application No. 60/782,600 filed on Mar. 16, 2006, entitled AUTOMATION CONTROL SYSTEM HAVING DEVICE SCRIPTING, to Seale MOORER et al.; Provisional Patent Application No. 60/782,634 filed on Mar. 16, 2006, entitled DEVICE AUTOMATION USING NETWORKED DEVICE CONTROL HAVING A WEB SERVICES FOR DEVICE STACK, to Seale MOORER et al.; Provisional Patent Application No. 60/782,595 filed on Mar. 16, 2006, entitled WIRELESS DIGITAL AMPLIFIER CONFIGURED FOR WALL MOUNTING, SHELF MOUNTING, AND THE LIKE, to Seale MOORER et al.; Provisional Patent Application No. 60/785,275 filed on Mar. 24, 2006, entitled AUTOMATION SYSTEM, to Seale MOORER et al.; Provisional Patent Application No. 60/793,257 filed on Apr. 20, 2006, entitled TOUCH SCREEN FOR USE WITH AUTOMATION SYSTEMS, to Seale MOORER et al.; Provisional Patent Application No. 60/747,726 filed on May 19, 2006, entitled COOLING DEVICE FOR A TOUCH SCREEN AND THE LIKE, to Seale MOORER et al.; Provisional Patent Application No. 60/746,287 filed on May 3, 2006, entitled HOME AUTOMATION SYSTEM AND THE LIKE, to Seale MOORER et al.; Provisional Patent Application No. 60/786,119 filed on Mar. 27, 2006, entitled HOME AUTOMATION PROGRAM CODE FOR SET TOP BOX OR SIMILAR CIRCUIT, to Steve CASHMAN; and Provisional Patent Application No. 60/857,774 filed Nov. 9, 2006, entitled PORTABLE MULTI-FUNCTIONAL MEDIA DEVICE, to Seale MOORER et al., all of which are hereby expressly incorporated by reference for all purposes as if fully set forth herein. Further, this application is related to the following U.S. patent applications: U.S. patent application Ser. No. 11/686,826, entitled NETWORK BASED DIGITAL ACCESS POINT DEVICE, filed Mar. 14, 2007, to Seale Moorer, et al.; U.S. patent application Ser. No. 11/686,836, entitled INTERNET PROTOCOL BASED MEDIA STREAMING SOLUTION, filed Mar. 15, 2007, to Seale Moorer, et al.; U.S. patent application Ser. No. 11/686,896, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTION, AND EVENTING THAT IS CONTROLLABLE WITH A TOUCH-SCREEN DISPLAY, filed Mar. 15, 2007, to Seale Moorer, et al.; U.S. patent application Ser. No. 11/686,884, entitled AUTOMATION CONTROL SYSTEM HAVING DIGITAL LOGGING, filed Mar. 15, 2007, to Seale Moorer, et al.; U.S. patent application Ser. No. 11/686,893, entitled USER CONTROL INTERFACE FOR CONVERGENCE AND AUTOMATION SYSTEM, filed Mar. 15, 2007, to Seale Moorer, et al.; U.S. patent application Ser. No. 11/686,846, entitled DEVICE AUTOMATION USING NETWORKED DEVICE CONTROL HAVING A WEB SERVICES FOR DEVICES STACK, filed Mar. 15, 2007, to Seale Moorer, et al.; and U.S. patent application Ser. No. 11/686,889, entitled AUTOMATION CONTROL SYSTEM HAVING DEVICE SCRIPTING, filed Mar. 15, 2007, to Seale Moorer, et al.; which are all hereby expressly incorporated by reference for all purposes as if fully set forth herein.

BACKGROUND OF THE INVENTION

1. Field of the Invention

The invention is directed to an automation convergence system user control interface, and more particularly to a configuration tool using Web services for devices in an automation convergence system.

2. Related Art

Household, academic facility and/or business spaces now more commonly have more than one audio or video device such as CD/DVD player, portable MP3 player, tuner, preamp, power amp, speakers, VCR, DVR, computers running media players or connected to some other source of audio or video (e.g., Internet radio, satellite radio and the like), etc. Typically, a CD/DVD player from one company comes with its own remote control and an amplifier by an entirely different company comes with its own remote control. The same space may have a PC with its keyboard and mouse, and yet another company's portable MP3 player with its own control switches. While each audio device is doing precisely what it was designed to do, each operates completely independent from the others with the possible exception of the portable MP3 player that may be connected to a PC for synchronization. As a result, a user ends up going from one keypad to another or juggling a series of remote controls in order to control the devices.

Since these audio/video and similar devices are not designed to communicate with each other or their communication is very limited, access to these audio/video devices is limited by their physical locations. For example, it is difficult to play an MP3 file saved in a PC hard disk drive in one room or area (a child's bedroom) on speakers located in another room or area (an entertainment room). Thus, in order for a user to enjoy music of his or her choice whenever and wherever he or she wants, each room needs to be equipped with all the necessary audio/video equipment and digital audio/video content.

Also, the audio/video devices are not designed to communicate with other home devices (e.g., TV, lighting, security system, etc.). Thus, it is difficult, if not impossible, to converge the devices for common control for certain occasions. For example, in order to watch a movie, the user must turn on a TV, a DVD player and an audio amplifier by using three different remote controls. Then the user must set the TV to receive a video signal from the DVD player, set the audio amplifier to receive an audio signal from the DVD player and use another control unit to adjust the lighting of the room. Even when a user utilizes a universal remote, as is known in the art, the result is a plurality of devices that are separately operated and are operated separately from a single universal remote. These devices do not converge and further there is no way to control their convergence as described above.

Accordingly, there is a need for a solution for the aforementioned accessibility, connectability, controllability and convergence issues.

SUMMARY OF THE INVENTION

The invention meets the foregoing needs using an automation specific IP based automation protocol, which results in a significant increase in discovery and communications between devices and other advantages apparent from the discussion herein.

In one aspect of the invention, a convergence and automation system (CAS) includes an internet protocol based network, hardware connected to the network, implemented with a web service for devices (WSD) protocol and including a plurality of devices, wherein each device is configured to perform at least one service, and a configuration tool to configure the CAS, to control hardware, and to converge and automate the services from the devices.

According to another aspect of the invention, a process for operating a convergence and automation system (CAS) includes implementing an internet protocol based network; connecting hardware implemented with a web service for devices (WSD) protocol to the network, wherein the hardware includes a plurality of devices and each device is configured to perform at least one service, and controlling the hardware to converge and automate the services from the devices with a configuration tool provided for configuring the CAS.

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings:

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
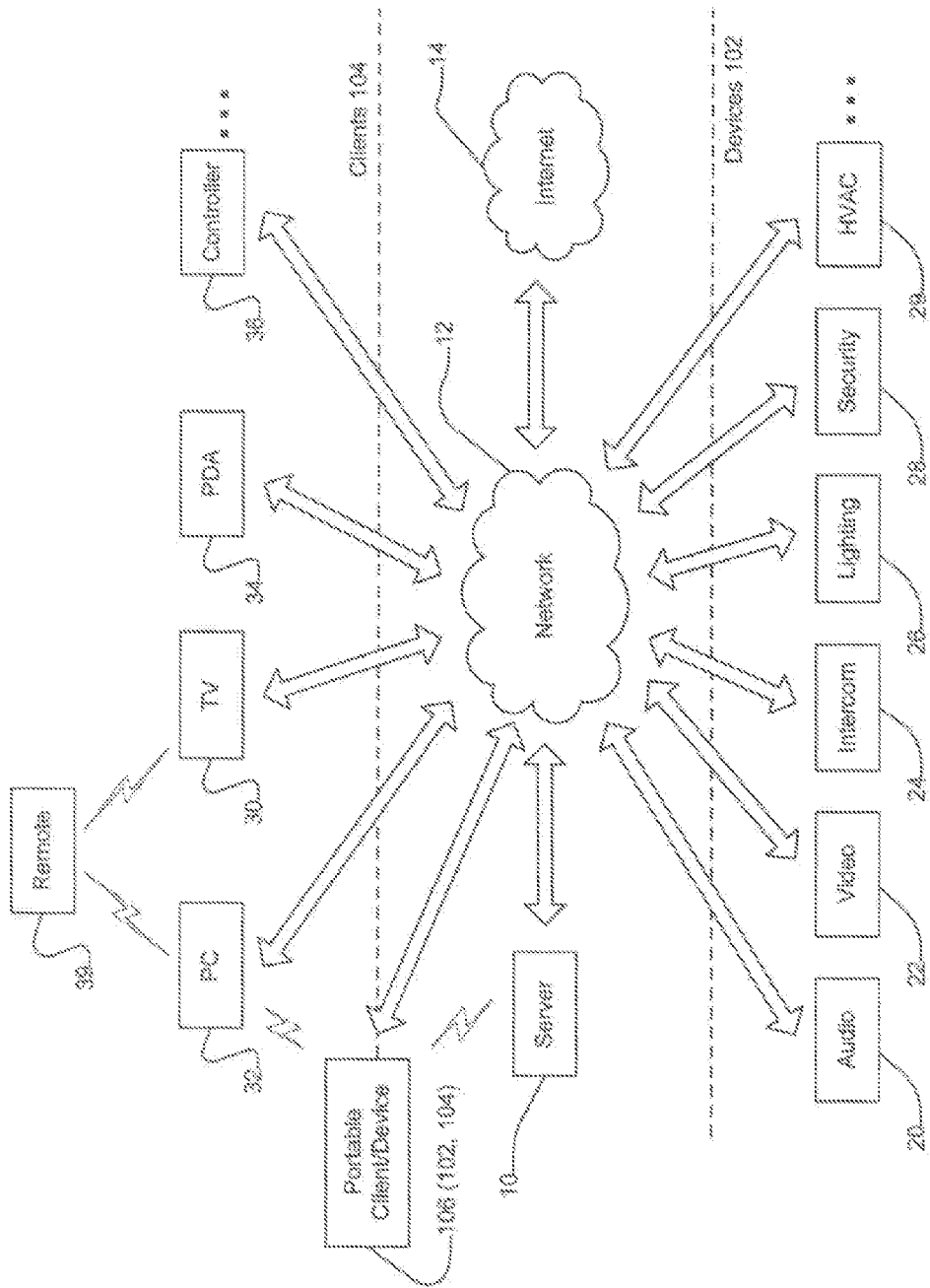
FIG. 1 shows a conceptual overview of a convergence and automation system (CAS) constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

The device/software modules, methods or implementations described herein are intended for operation with dedicated hardware implementations including, but not limited to, semiconductors, application specific integrated circuits, programmable logic arrays, and other hardware devices constructed to implement the software modules, methods or implementation functionality described below. Moreover, various embodiments of the invention described herein are intended for operation as software programs running on a computer processor such as PC running the Windows™ operating system as is well known in the art. The functional and operational description of the various device/software modules, methods or implementations described herein may be used together, separately, or in various combinations thereof.

The device/software modules, methods or implementations will now be described in detail.

Definitions of the Terms

The terms used in the present invention and their definitions are listed in Table 1.

TABLE 1

| Term | Definition |
| --- | --- |
| Action | A basic building block of a script command that is sent to a device to cause a change. Actions are combined with action properties to comprise commands. |
| Device association | A way of grouping devices that are not necessarily related in order to more easily configure learning scripts. |
| Client | Complete, stand-alone personal computer (not a "dumb" terminal) offering a user its full range of power and features for running applications. This is also known as the front-end computer, while the server is known as the back-end computer. |
| Command | A basic building block of a script that sends an action and any associated action properties to a device to accomplish a specified change. Scripts are comprised of a string of commands. |
| Communications | A link between a component and CAS or a device and a component that enables information to be passed between the two items. |
| Component | Basic building block of a CAS configuration that includes a controller (intelligence) and the devices regulated by the controller. For example, a component is an HVAC system controller combined with the thermostats regulated by the controller. Some components contain the intelligence in the device, resulting in a self-contained component. |
| Component Details | Properties set up in CAS to enable the component to communicate with other components on the network where CAS resides. |
| Configuration | Collection of components, devices, menus, scripts, and schedules and corresponding properties for a particular CAS installation. |
| Controller | A hardware element that regulates a device within an overall component. Also known as an intelligent system. |
| Control Group | A way of grouping similar devices (e.g. Lutron lights) so the user has the ability to operate the entire group as a single device. |
| Device | Individual hardware element in a home network such as a light or a thermostat. |
| Discovery | The ability of CAS to detect components and their devices on a home network and to retrieve information from the devices. |
| Global Menu | Menu that sets up devices applying to all areas of the menu configuration across the sub system (audio systems, weather, and cameras) that enable the customer to access the device from any room in the home. After a device is setup in the global menu, the device appears in all menus. |
| Integrator | Person who uses the CAS configuration tool to add, edit, and delete components in the configuration and creates the scripts and schedules from the worksheets and information provided by the various system installers. |
| Intelligent System | A hardware element that regulates a device within the overall component. Also known as a controller. |
| Menu | Screen in the CAS interface that displays devices, device categories or scripts that can be accessed from a specific room. Types of menus include: room, sub, global, and MCE menus. |
| Schedule | Time period when the script is to automatically run. A schedule consists of a schedule type (start time and date, or day) and an action (script to run). |
| Script | String of commands that sends actions to a variety of devices. For example, you can have a script that sends a command to turn on the lights in the foyer, lower the audio volume, and then ramp up the temperature on the thermostat. Scripts can be |

TABLE 1-continued

| Term | Definition |
| --- | --- |
| | triggered either manually (button activated) or automatically (scheduled). Scripts run the commands in the order they appear in the script. |
| Server | A computer that serves up information to other applications and client computers. This is also known as the back-end computer, while clients are known as front-end computers. |
| Service | 1. Program or routine that provides support to other programs, particularly at a low (close to the hardware) level. 2. In networking, specialized, software-based functionality provided by network servers-for example, directory services that provide the network equivalent of "phone books" needed for locating users and resources. |
| Service Provider | A computer hardware element on which CAS resides and provides control of the various devices integrated with CAS. |
| Source | The device that is the point of origin for audio for the component. |
| Trigger | An event that can be added to a script that, if it occurs, will cause the system to function in a particular way (e.g., if an alarm is deactivated, the lights will come on). |
| Zone | An area of coverage for an audio or a security system component. For example, you can have one security camera component that covers the back door and patio area (zone 1) and a second security camera that covers the front door area (zone 2). |

Overview

FIG. 1 shows an overview of a convergence and automation system (CAS) for use with various devices, such as, for example, media consumption device, home appliances, security devices, communication devices, and the like, constructed according to the principles of the invention. The CAS solution may be a combination of hardware and software. The hardware may include a server 10 connected to a network 12 (e.g. IP based wired or wireless network such as an Ethernet network) and may possibly be connected to the internet 14, devices 102 (e.g. audio 20, video 22, intercom 24, lighting 26, security system 28, HVAC 39, and the like) and clients 104 (e.g. TV 30, personal computer (PC) 32, personal digital assistance (PDA) 34, controller 36 such as a control panel, game controller (i.e. XBox™ (not shown) and the like). Moreover, the clients 104 may include a remote control 39 or a portable device 106 for remote control, communications and media consumption, which may be configured to function as both the client and device. The server 10 may be any type of computer, such as a PC connected to the network 12. The clients 104 such as clients 30, 32, 34, 36 provide a user with control over the devices 102 such as devices 20, 22, 24, 26, 28, 29.

The software (i.e. applications) enables the hardware devices 102 and/or clients 104 to communicate with each other despite their different proprietary languages and communication protocols, and may provide the user with control over most or all the hardware from a single client. The application may utilize at least one portion of the hardware to send commands to the devices 102 and receive feedback from them. The application integrates centralized device control into a PC based media environment (e.g., Microsoft Windows XP Media Center™ or Microsoft Windows Vista™ environment) that may store, organize and play digital media content. The user may use the remote control 39 or the portable device 106 to listen to music, watch and record television, enjoy family photographs and home movies, as well as adjust the lighting, secure the home, adjust the temperature, distribute music throughout the house, check surveillance cameras and the like. Moreover, the portable device 106 has further communication features as noted below.

The application may be implemented with Web Services. The Web Services use standard Internet protocol (IP) and are based on standard XML-related technologies such as SOAP (Simple Object Access Protocol) for communications and WSDL (Web Services Device Language) to describe interfaces. The devices implemented with Web Service for Device (WSD) become black boxes on the network, providing services to any application, on any platform, written in any language. Moreover, the use of WSD allows for the capabilities of Universal Plug and Play (UPnP) that seamlessly connects and simply implementation as is known in the art.

The invention is directed to a configuration tool for the CAS solution, which allows a system integrator to configure the devices 102 and/or clients 104 to integrate through one location such as the server 10. The configuration tool may be a software application that allows the user to configure the communications among the devices 102 that are being integrated through the CAS software on the network 12 after the hardware installation and wiring connection are completed.

Figure 2:
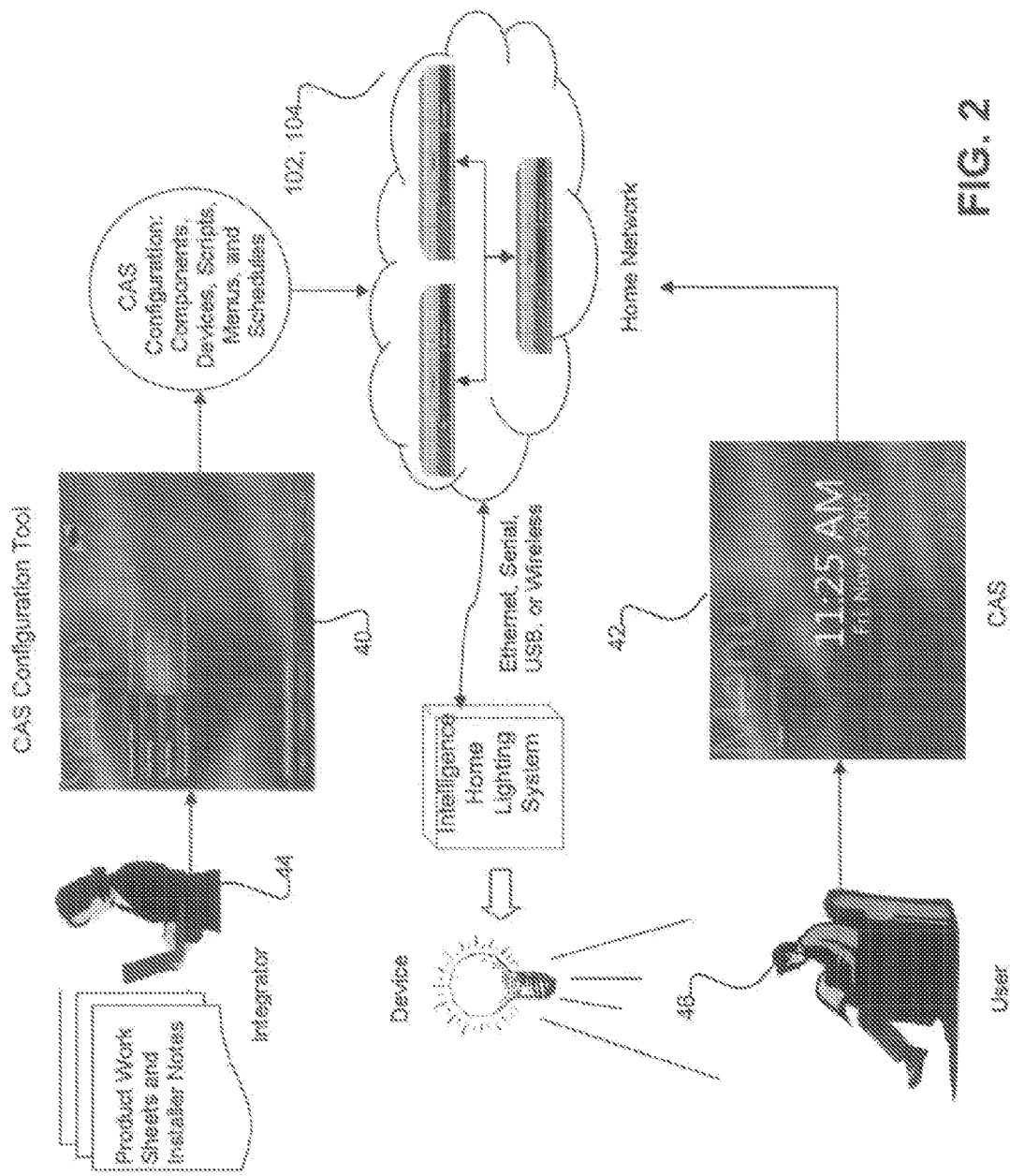
FIG. 2 shows a conceptual overview of how a CAS configuration tool is integrated into the CAS system constructed according to the principles of the invention.

FIG. 2 shows a conceptual overview of how the configuration tool is integrated into CAS. A system integrator 44 may work on the sever 10 connected to the network 12 and implemented with a configuration tool 40, to configure and maintain the CAS solution shown in FIG. 1. For example, the integrator 44 may enter information into the configuration tool 40 to create a CAS configuration that resides on the sever 10 to converge and automate the services from the devices 102. A user 46 may interact with a CAS interface 42 to take advantage of the CAS solution. Using the configuration tool 40, the integrator may create new configurations; load and copy existing configurations; add, edit, and delete components and devices; associate devices for scripting purposes and group similar devices for control; add, edit, and delete menu, sub menu and global menu items; add, edit, and delete scripts (i.e. scenes) and schedules and the like.

Figure 3:
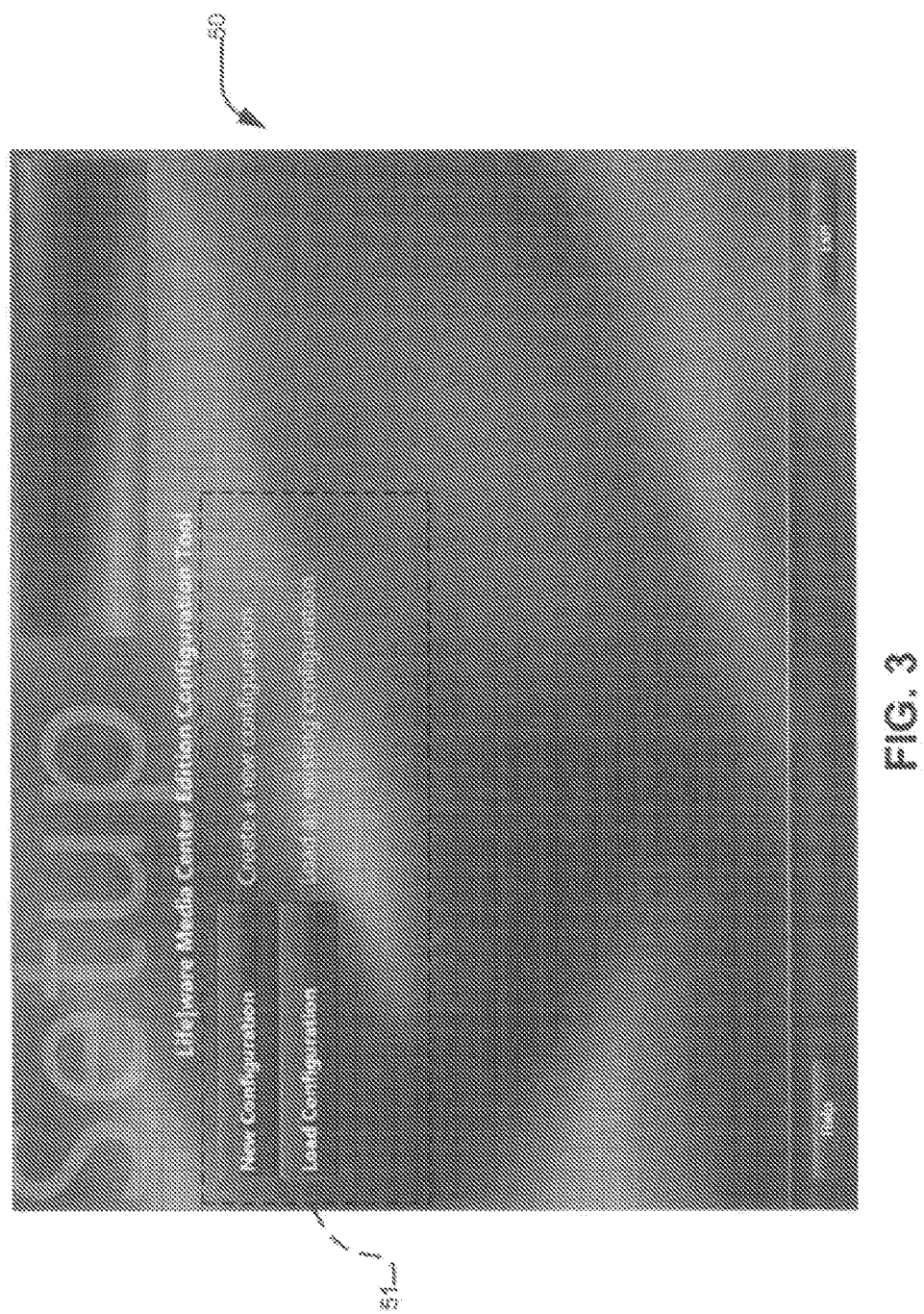
FIG. 3 shows a screen capture image of a main screen 50 of the configuration tool shown in FIG. 2.

FIG. 3 shows an exemplary main screen 50 of the configuration tool 40, where the integrator 44 may create a new configuration or load existing configurations 51. The integrator 44 may navigate the configuration tool 40 using a mouse, keyboard, remote control or the like. Creating a new configuration may involve the following tasks that may need to be completed in the sequence: naming the configuration; adding components; adding devices; adding control groups; adding device associations; creating scripts; creating menus; creating schedules; creating script triggers; and Saving the configuration. The integrator 44 may also create schedules using the configuration tool 40. The integrator 44 may select a schedule type such as daily, weekly, monthly and one time only. Also, the integrator 44 may configure triggers such that a script (series of automation commands to the devices 102) may be automatically executed whenever predetermined conditions met. Once a configuration is created, the integrator 44 may use the configuration as a starting point for other configurations, add or delete components and devices, activate a different configuration to meet the user's needs.

Figure 4:
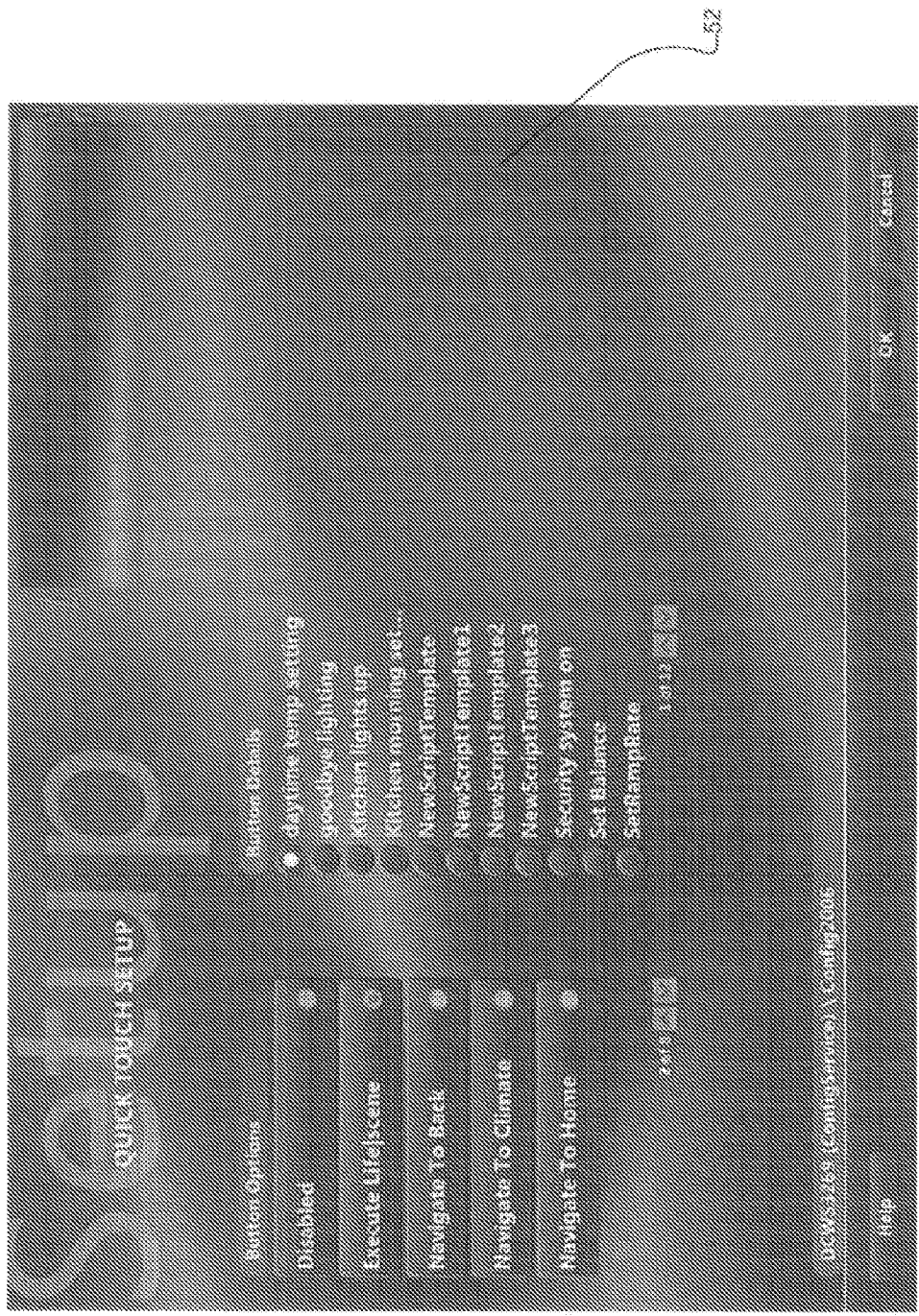
FIG. 4 shows a screen capture image of a configuration setup screen of the configuration tool shown in FIG. 2.
Figure 5:
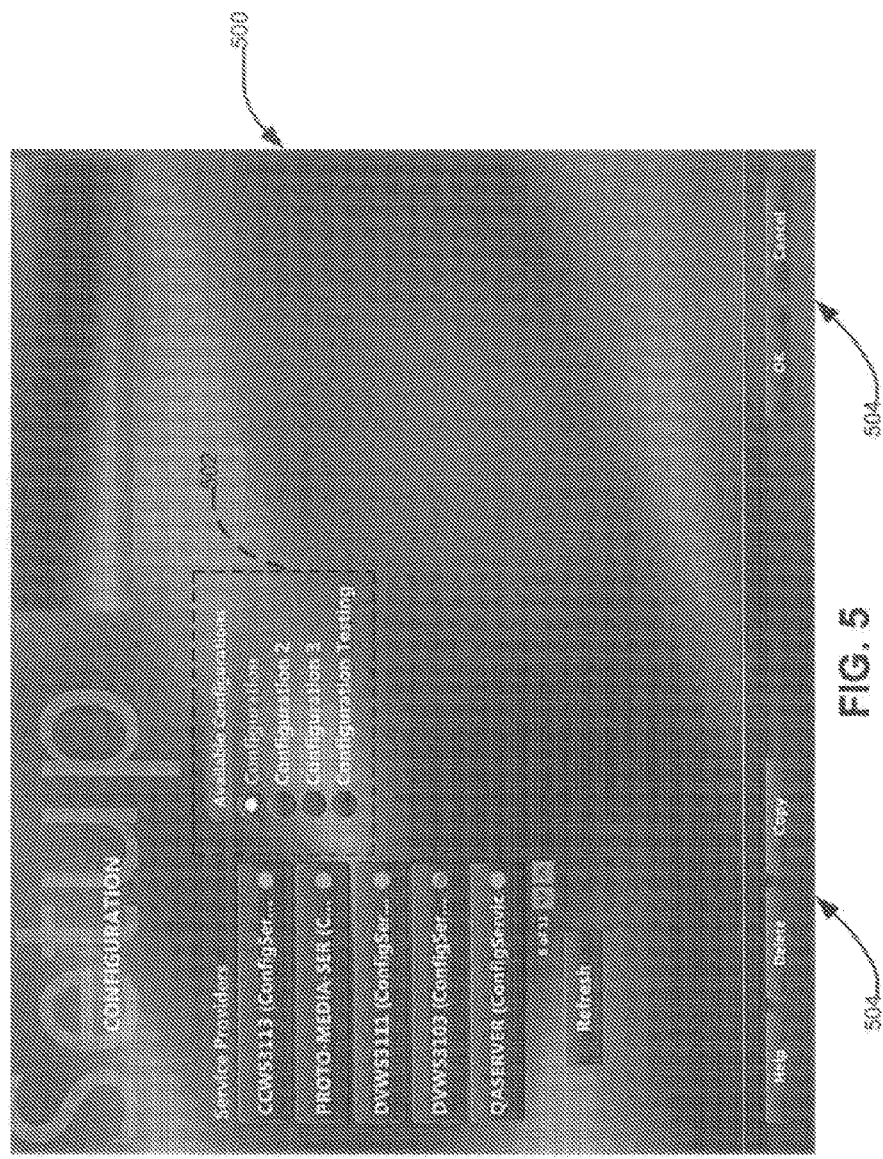
FIG. 5 shows a screen capture image of a configuration screen of the configuration tool shown in FIG. 2 being used to select one of the configurations available for service providers.

After creating a configuration, the integrator 44 may load the configuration into the configuration tool 40 from the main screen 50 to edit, copy, activate or delete the configuration. FIG. 4 shows a configuration setup screen 52 that may allow the integrator 44 to make changes the component, association group, script, menu, schedule and trigger for a selected service provider. The CAS solution may have multiple configurations on a single service provider, but may allow only one configuration to be active at a time. Thus, the integrator 44 may need to set one configuration as the controlling configuration on the service provider, as shown in the screen 500 in FIG. 5. Configurations 502 may become obsolete over time as components change and the network grows. When this occurs, the integrator 44 may delete a configuration that is no longer useful to the user 46 or take other action through buttons 504.

Components

The configuration tool 40 may allow the integrator 44 to work with the components in the existing configurations. Components are the basic building block of a configuration that includes a centralized intelligent system and the devices regulated by the intelligent system. For example, a component may be an HVAC system controller (i.e., intelligent system) combined with the thermostats (i.e., devices) regulated by the HVAC system controller. Before adding devices, creating scripts or schedules, it may be necessary to add components to a configuration or have access to remote devices on other service providers. For example, if the user 46 adds a new audio system after the initial integration with the CAS solution is completed, the integrator 44 may open the existing configuration and add the audio system to that configuration.

Figure 6:
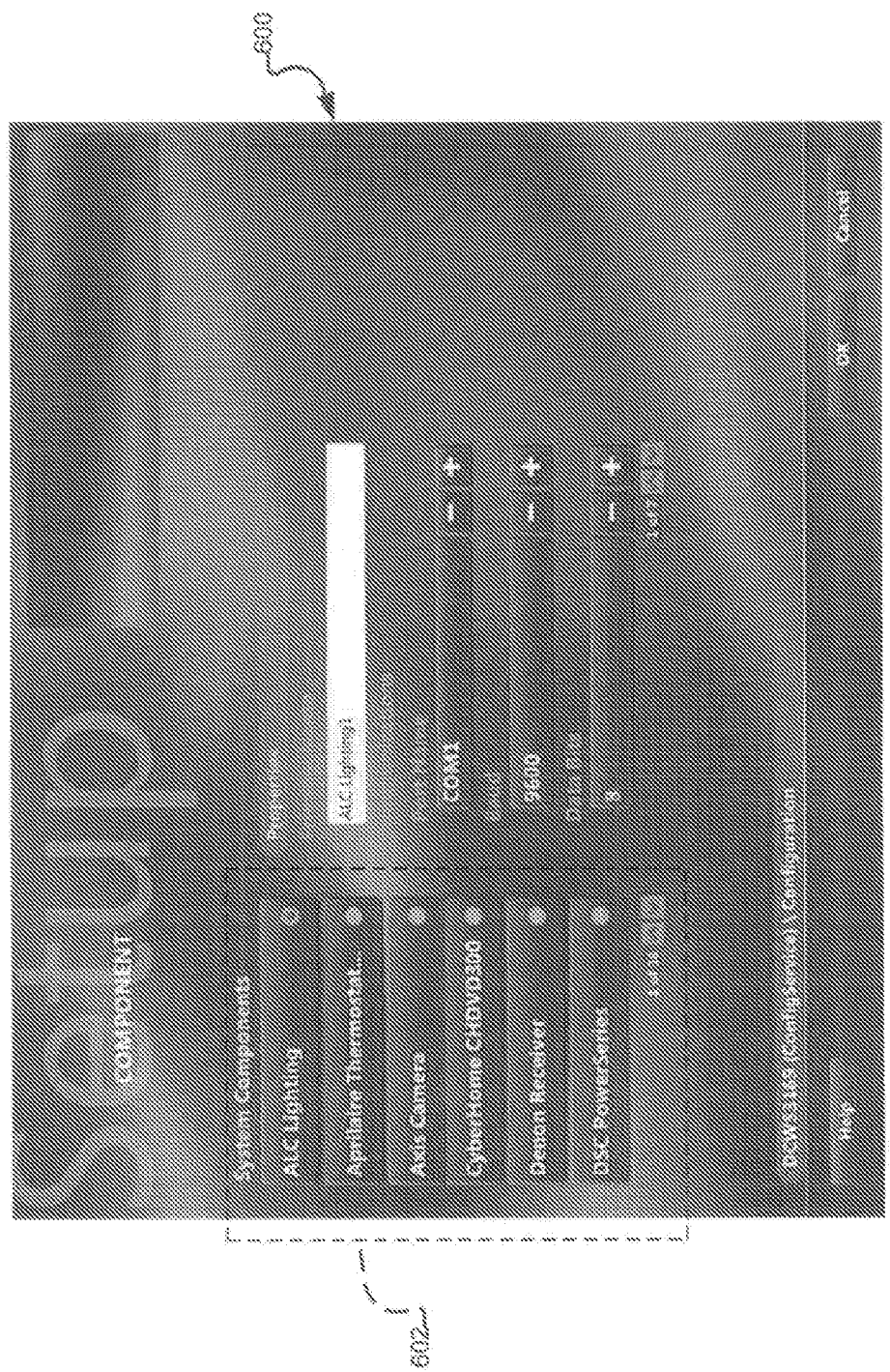
FIG. 6 shows a screen capture image of a component setup screen of the configuration tool shown in FIG. 2.

To add a component to an existing configuration, the integrator 44 may select the "component setup" from the configuration setup screen 52 shown in FIG. 4, select "Add Component" from the component setup screen (not shown). Then, as shown in screen 600 in FIG. 6, under "System Components," the integrator 44 may select the component 602 that he or she wants to add to the configuration. As the network changes and components change, a new configuration may be necessary to meet the user's needs. It may not be necessary to create a new configuration to make a change to the component because one may be able to simply edit the existing component from the configuration tool 40. If a component is no longer required, or if the user changes the type of component after the initial configuration, the configuration tool 40 allows the component to be deleted. Also, the configuration tool 40 may be configured to be able to print a report for any or all of the components in a configuration.

Zone

Figure 7:
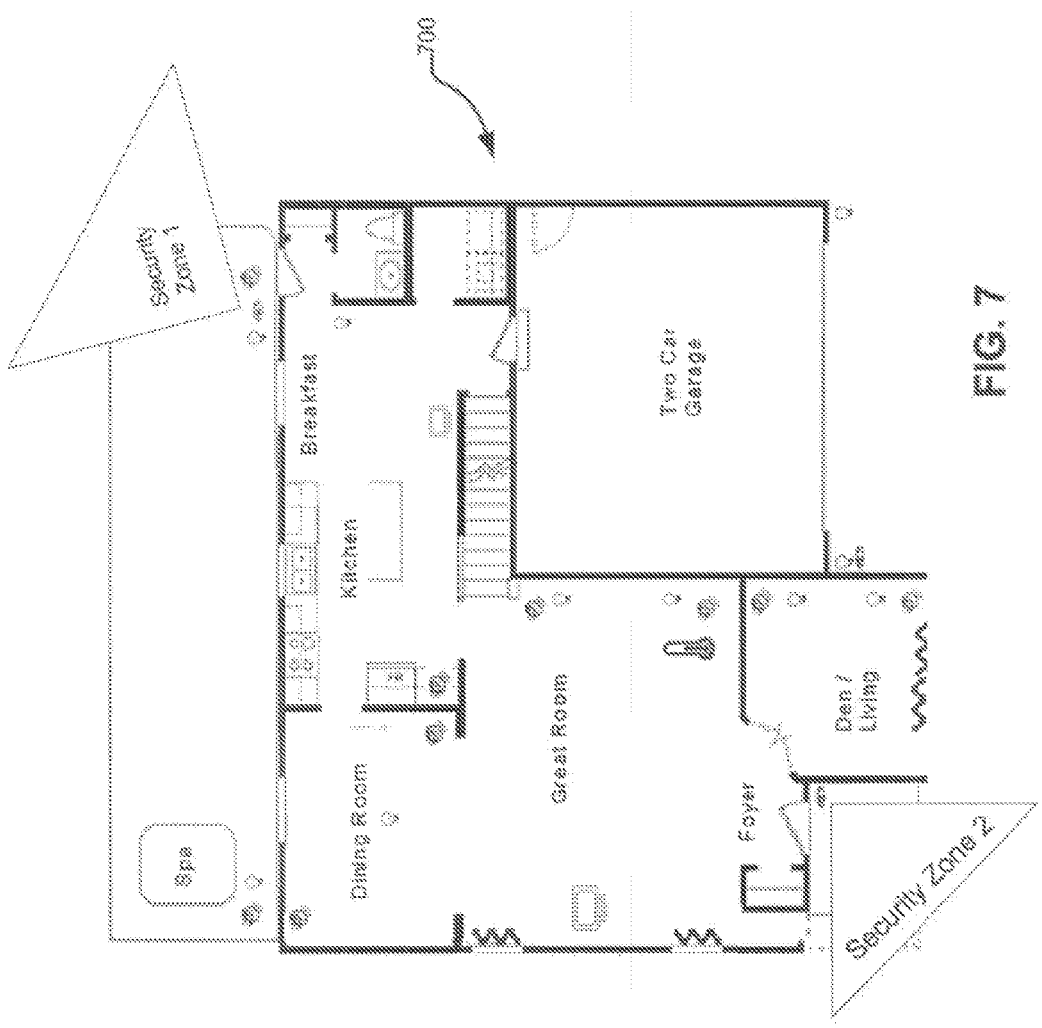
FIG. 7 shows a layout view of a house having two security zones.
Figure 8:
FIG. 8 shows a screen capture image of a zone setup screen of the configuration tool shown in FIG. 2.

FIG. 7 shows a layout view of a house 700 having two security zones. A zone may be an area of coverage for an audio component or a security system component. For example, FIG. 7 shows one security camera component covering the back door and patio area (i.e., security zone 1) and another security camera component covering the front door area (i.e., security zone 2). Two types of components may be associated with a zone: audio components and security system components. As shown in screen 800 in FIG. 8, the configuration tool 40 may allow a zone to be added to a component 802. Once zones are added to a component in a configuration, one may edit 804 the zones to meet the needs of the user 46. Also, if the network changes or audio and/or security components are added and deleted from the network, one may delete 806 the zones using the configuration tool 40. If an audio or security component supports discovery, the configuration tool 40 may discover 808 the zones automatically.

Sources

Figure 9:
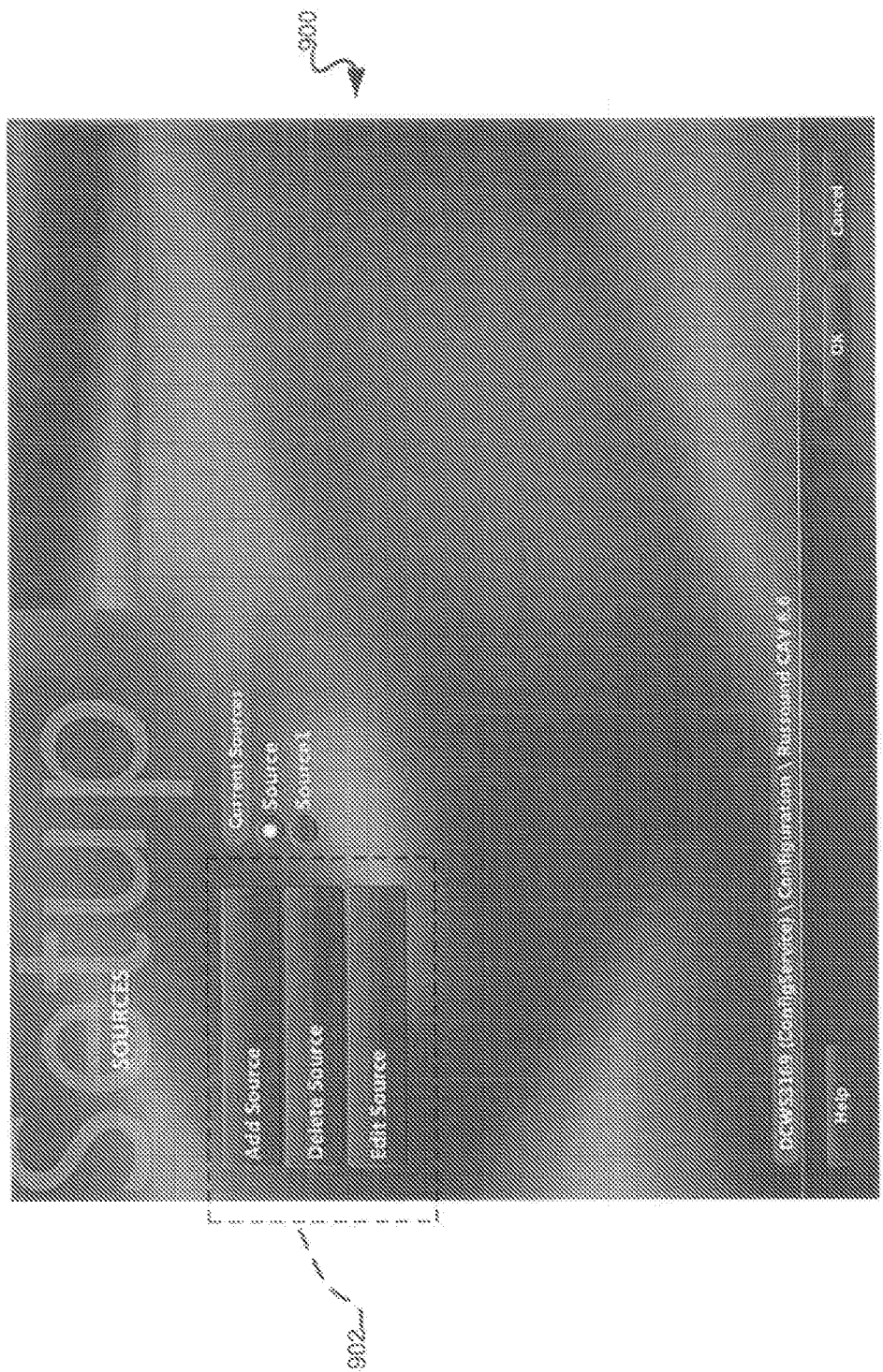
FIG. 9 shows a screen capture image of a sources setup screen of the configuration tool shown in FIG. 2.

Sources may be the hardware elements of CAS, such as, for example, receivers and CD players that provide audio content to other audio components such as computers, media centers and the like. The configuration tool 40 allows the audio component to be associated with a source so that the component may be able to access the audio content from the source, as shown in screen 900 in FIG. 9. Also, the configuration tool 40 may allow changing and deleting existing sources via buttons 902.

Devices

Figure 10:
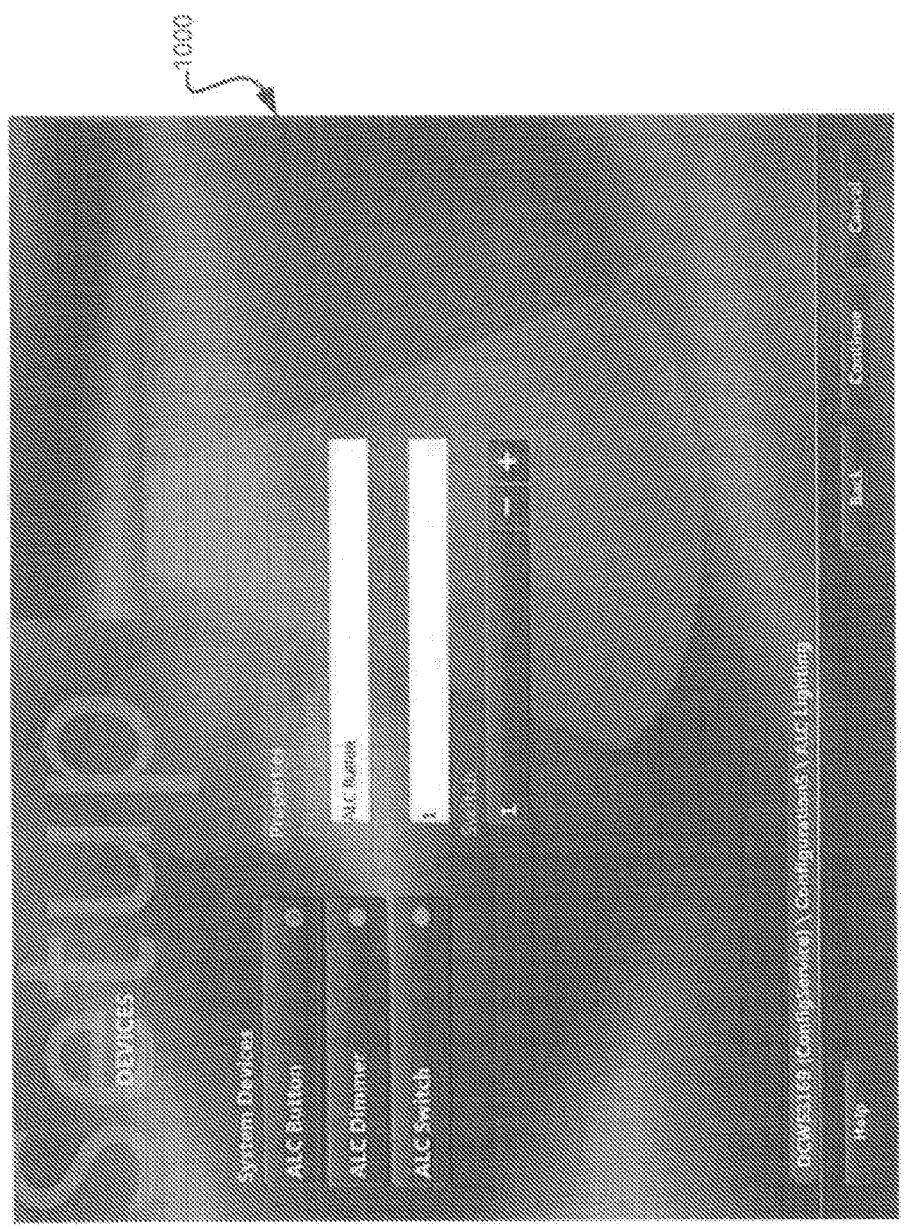
FIG. 10 shows a screen capture image of a devices setup screen of the configuration tool shown in FIG. 2.

Devices are individual hardware elements in CAS such as, for example, a light, thermostat and the like. A device may be only a half of a component in CAS, with the other half being a centralized intelligence system/component, which may control the operation of the device. As shown in screen 1000 in FIG. 10, the configuration tool 40 may allow devices to be added to an existing component. Only a compatible device may be added to a specific component. For example, a lighting device may not be added to an HVAC component because they are not compatible. Once a device is added to a configuration, the configuration tool 40 may allow the device to be included in a script to run automatically or manually. Also the configuration tool 40 may allow a device to be added to a sub menu to display it in a specified room or area. A device may be included in a control group with similar devices (e.g., lighting devices) such that the devices may be controlled as one. The configuration tool 40 may associate a device with other devices that are not necessarily related in order to more easily configure learning scripts.

Devices may be grouped so they may be operated as one device if they are similar devices within the same component. The configuration tool 40 may configure all devices to move together relative to a master device's starting point, which is referred to as relative manipulation. For example, if two thermostats are grouped and the master thermostat is raised 5 degrees (i.e., from 70 to 75 degrees) the second thermostat may be raised 5 degrees as well (i.e., from 68 to 73 degrees). Alternatively, the grouped devices may assume the setting of the master device when, for example, the temperature is increased to 75 degrees, which is referred to as absolute manipulation. Also, the configuration tool 40 may associate devices that are not necessarily related (e.g., a light device and shading device) as a group, which is referred to as a learning script.

Figure 11:
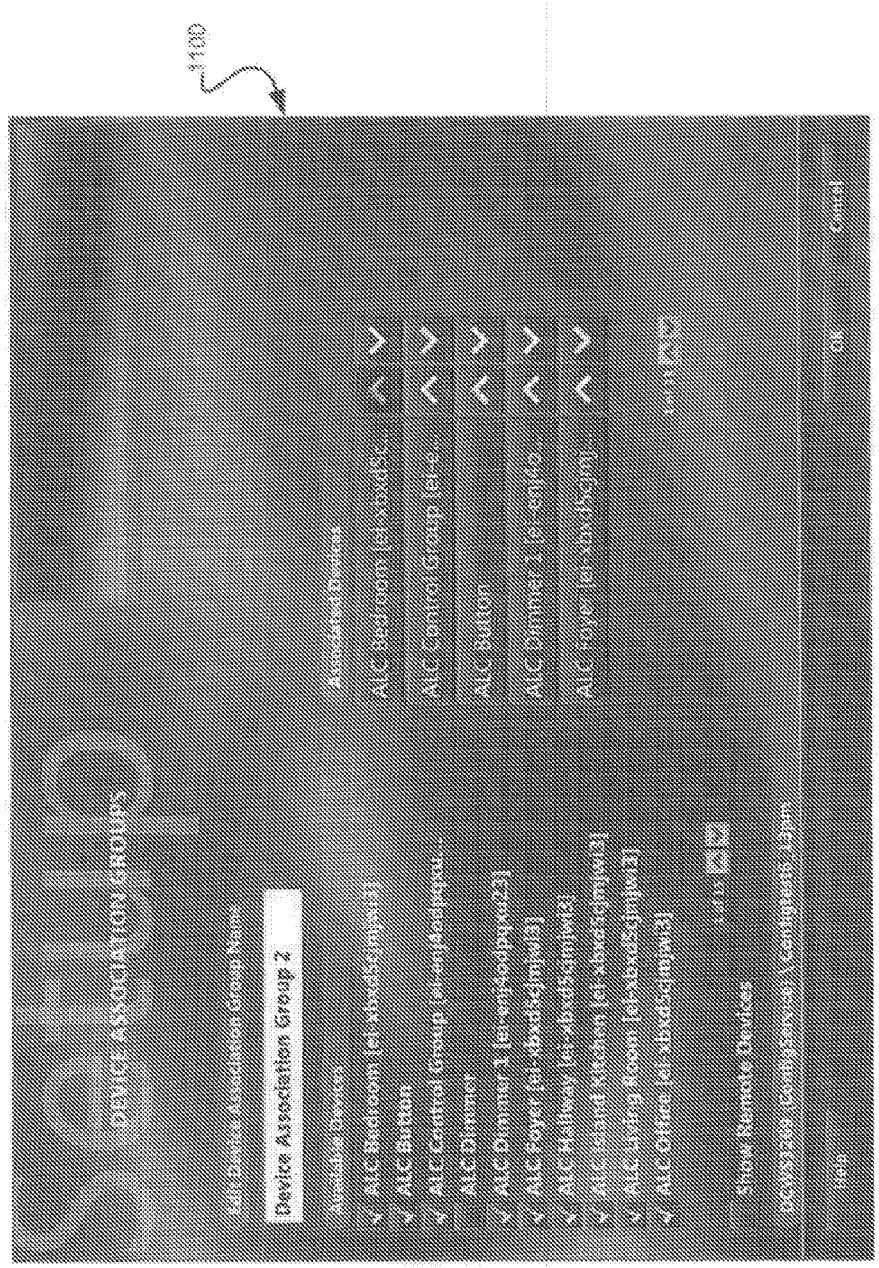
FIG. 11 shows a screen capture image of a device association groups setup screen of the configuration tool shown in FIG. 2.

Devices may become obsolete because of remodeling, repairs, or other reasons. When this occurs, the configuration tool 40 may be used to edit the device to meet the new needs. Also, the configuration tool 40 may be used to edit a control group and device association group. For example, FIG. 11 shows a device association groups screen 1100 where one may make changes to a device association group. Also, the configuration tool 40 may be used to delete a device, control group and device association group.

A device may be produced in a manner that enables it to be discovered in CAS. In that case, the configuration tool 40 may be used to discover the device along with all of the properties associated with the device. Discovery is the ability of CAS to automatically detect components on the same network and retrieve information about their devices. For example, a light is added to CAS, it may not necessary to add properties manually to the configuration to support the light because all of the information related to the light may be automatically recognized and placed into the proper files for use in CAS.

Scripts

A script is a string of commands that sends actions to a variety of devices for a predetermined effect. By using a script, different types of devices may be simultaneously controlled. For example, a script may be created to turn on the lights in the foyer, lower the audio volume, and then ramp up the temperature on the thermostat. Scripts may be triggered either manually or automatically (i.e., scheduled or triggered by an event). Scripts may run a string of commands in the order they appear in the script.

Figure 12:
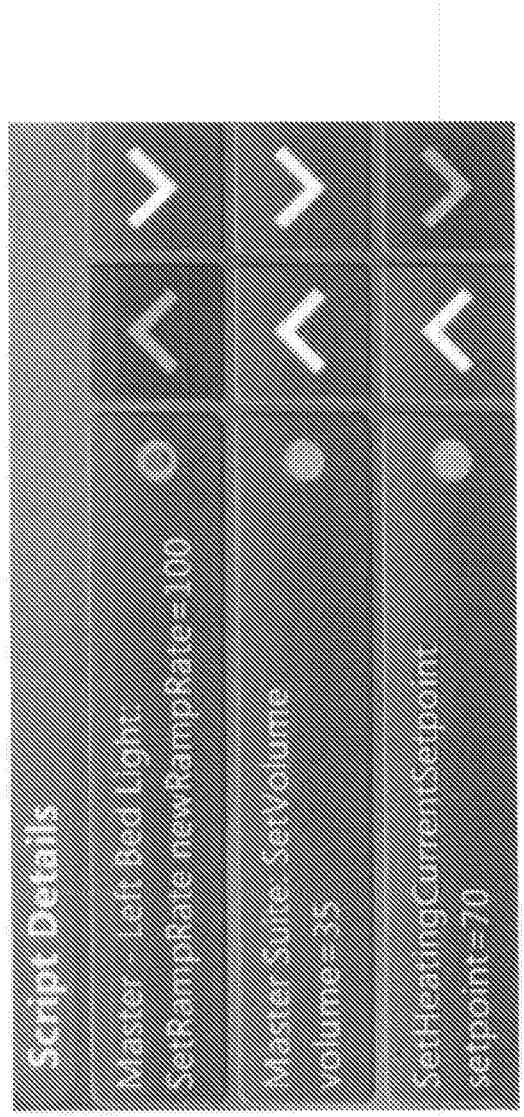
FIG. 12 shows an exemplary script that may be created with the configuration tool shown in FIG. 2.

The configuration tool 40 may allow one to create a script, which is a string of commands/instructions to CAS. A command may consist of an action and the action properties. An action may specify what needs to occur and the action properties may specify how the action to occur. For example, bringing a light up to 50 percent brightness involves the action of bringing the light up and the action property of 50 percent. Scripts may run in the order that the commands appear in script Details in a script command screen of the configuration tool 40. For example, FIG. 12 shows a simple script that (a) the left bed light in the master bedroom ramps up to 100 percent, (b) the master suite audio volume is set to 35, and (c) the thermostat is set to 70 degrees.

Figure 13:
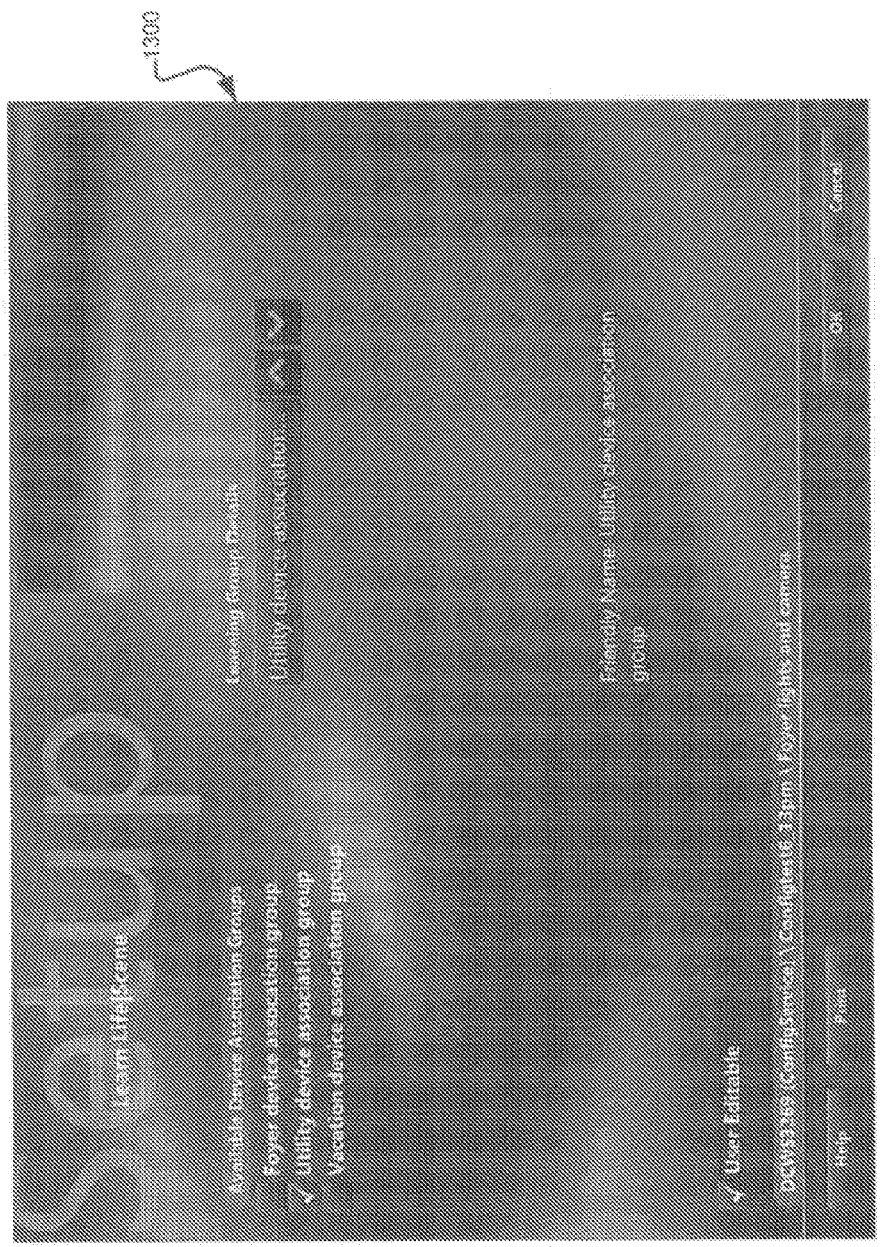
FIG. 13 shows a screen capture image of a learn scene setup screen of the configuration tool shown in FIG. 2.

If one changes a component or device, or adds a new component, he or she may use the configuration tool 40 to edit the script to reflect the changes. Also, the configuration tool 40 may be used for creating a user-editable script in an existing configuration. A user-editable script (i.e., learn scene) may allow one to set a group of devices to a specific level and then record the level in the editable script, as shown in FIG. 13. Also, the configuration tool 40 may be used to change the scripts on service providers if new components are added or components are deleted. For example, if a device name changes, one may edit the script to reflect the new device name. If a script becomes obsolete, one can delete the script from an existing configuration.

Figure 14:
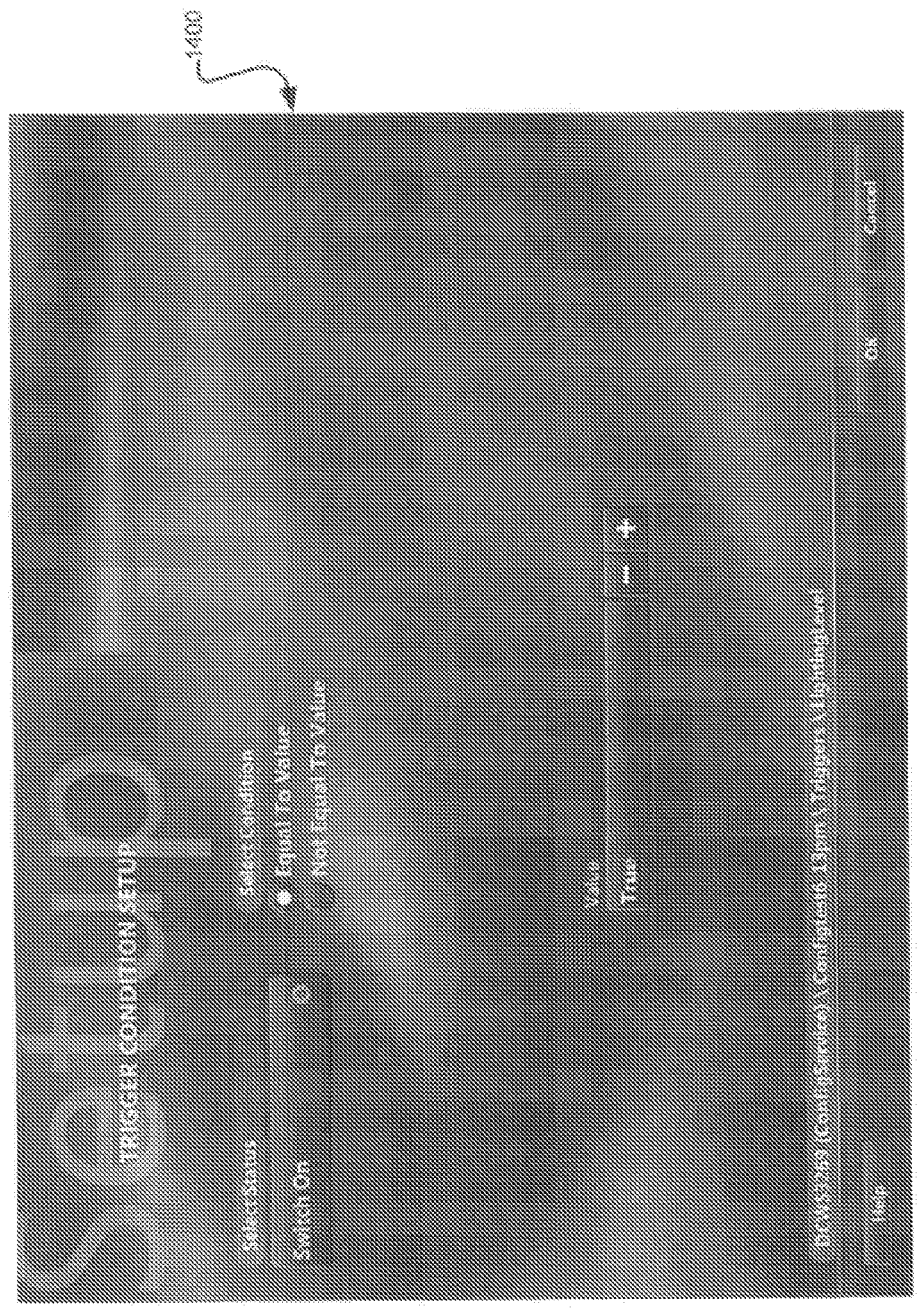
FIG. 14 shows a screen capture image of a trigger condition setup screen of the configuration tool shown in FIG. 2.

The configuration tool 40 allows a trigger setup to configure a script action to run when predefined conditions are met. FIG. 14 shows a trigger condition setup page 1400 of the configuration tool 40, where a trigger is set up such that when a lighting switch is on, it may trigger the script added thereto. For example, if one wanted music to play when the light is on, the script may be used to accomplish that. Also, the configuration tool 40 may be used to edit or delete an existing trigger setup.

Menus

Figure 15:
FIG. 15 shows a screen capture image of a main menu of the configuration tool shown in FIG. 2.

Menus are screens in the CAS interface 42 in FIG. 2 that may display devices, device categories or scripts that may be accessed from a specific room or area. In the CAS, there are several types of Menus such as a main menu, menu, sub menu, global menu, MCE (Media Center™ Environment) menu and the like. Each main menu may be divided into menus, which may be further divided into sub menus. The main menu may be the overall menu for an area which is covered by a single CAS solution (e.g. home, office, guest house or the like). FIG. 15 shows an example of the main menu including text that may be changed by using the configuration tool 40. The main menu may display the list of menus (for rooms or designated areas) and any devices that are set up specifically for the main menu. The menu may generally correspond to a specific room, area or zone. The sub menu may display subsequent options or devices after the menu option is selected. For example, if a kitchen menu is selected, the sub menu may appear with all devices associated with the kitchen. The global menu may make audio or weather devices available as options for any menu within the main menu. An item on a global menu may be available globally, even though it still may need to be selected for each menu. The MCE menu may appear when one use CAS with Media Center™ as the service provider. If "Set MCE Menu" is selected in the configuration tool 40, the global menu may be integrated with the MCE menu, and the menu items may appear in Media Center™.

The configuration tool 40 may provide the flexibility to add menus as sub menus. For example, if one wants to be able to control the foyer devices from the master bedroom, he or she may use the configuration tool 40 such that the master bedroom menu may have the foyer menu as a sub menu. In CAS, the main menu may contain another level of menus. Using the configuration tool 40, one may add, edit, or delete these menus from the configuration. For example, the configuration tool 40 may be used to add a new menu may to an existing main menu, edit a menu name in an existing configuration and delete a menu from an existing configuration.

The global menu may make a component or device available across the main menu for certain devices, such as audio and weather. Once a device is set up in the global menu, it may be selected for any menu within the main menu. For example, "audio" in the global menu may provide a list of audio zones when one accesses "audio" on any screen. Also, "weather" may provide support for only one weather component for the main configuration. A global menu device may be added or removed from a single menu, if necessary. If one wants to create a menu item one time and have it available in all menus, he or she may associate the device (e.g., audio or weather) from the global menu. The configuration tool 40 may be used to delete a sub menu with a global menu category and remove an individual device from global menu options.

Figure 16:
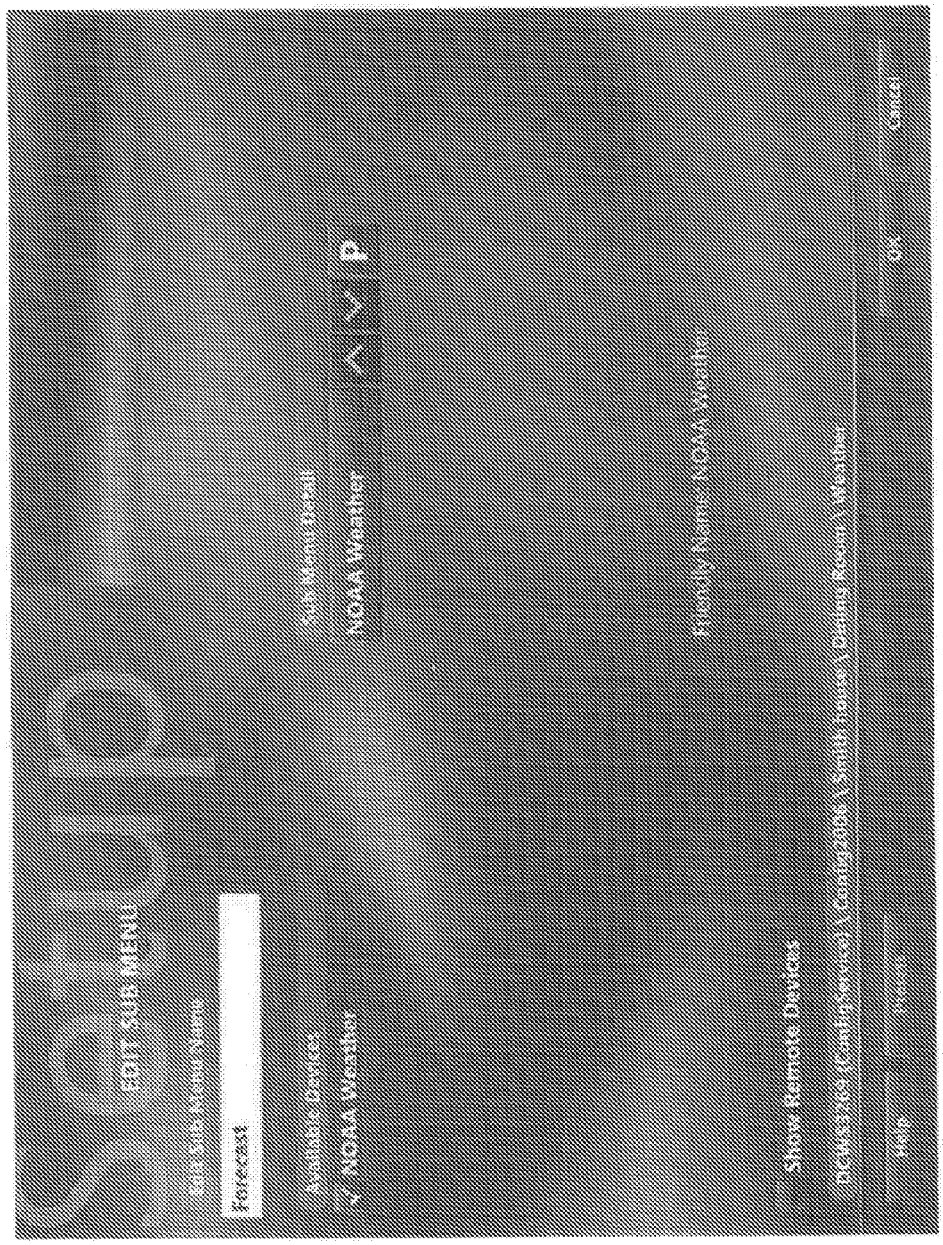
FIG. 16 shows a screen capture image of an edit sub menu screen of the configuration tool shown in FIG. 2.

A sub menu is a secondary menu that may display subsequent options after a menu option is selected. For example, a "Den" menu might include the sub menus such as "light" with light switch, dimmer, and push button (i.e., device), "audio" with CD player and audio receiver (i.e., device), "climate" with programmable thermostat (i.e., device), individual scene with a script that turns on lights, music, and sets the thermostat (i.e., script), and the like. Each menu created for a room or area may need to have at least one sub menu item associated with it. A sub menu may be added to a configuration in an edit sub menu of the configuration tool 40 as shown in FIG. 16. Also, the configuration tool 40 may be used to add a device, menu, script to a sub menu. As mentioned above, a user-editable script may have no commands and allows the users to record settings from a pre-defined group of devices, which was referred to as a device association group. A user-editable script may be displayed from a Settings sub menu of the configuration tool 40, which may be used to edit a sub menu and MCE menu.

Schedules

Figure 17:
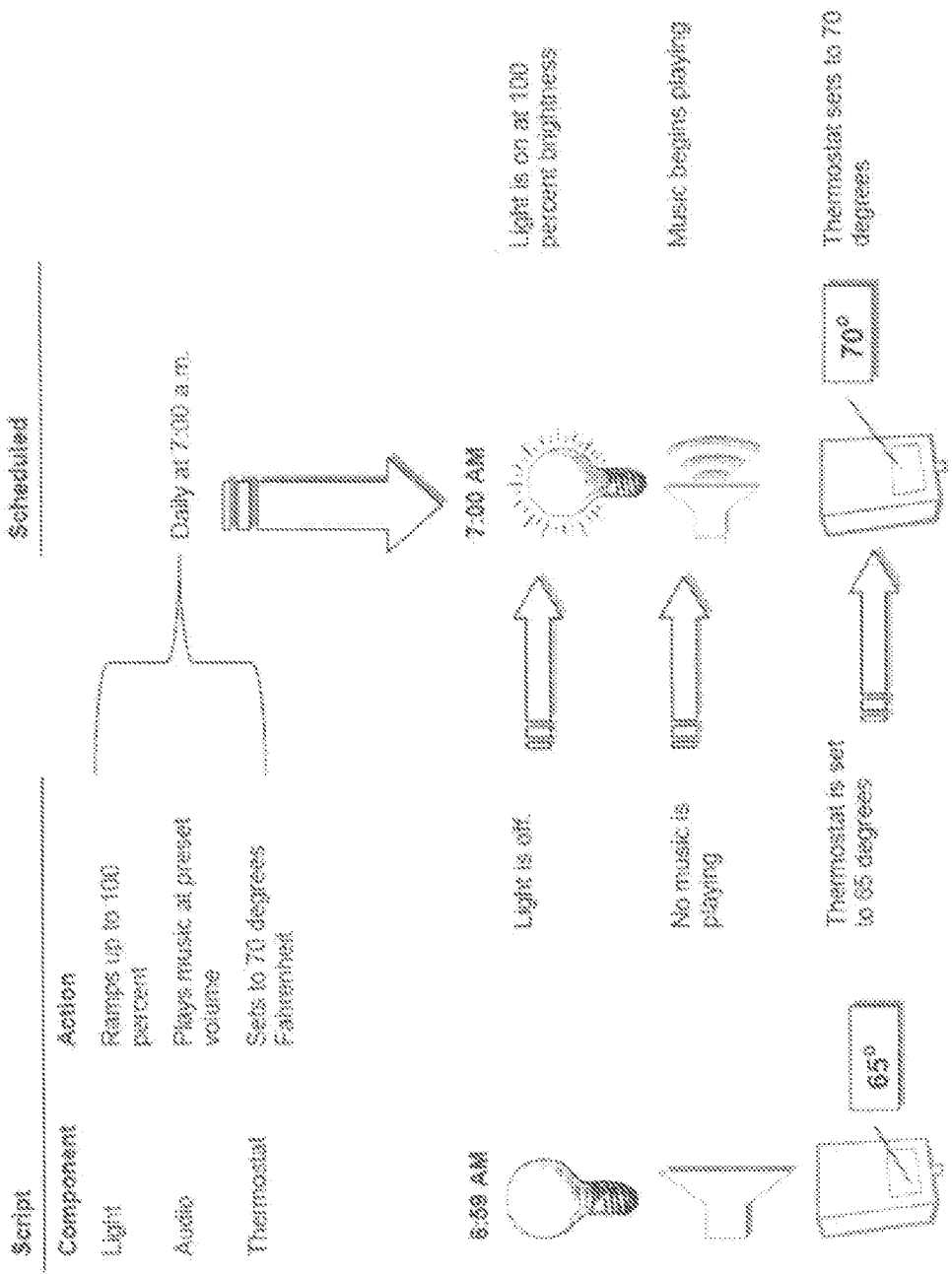
FIG. 17 shows an example of how a scheduled script is executed in CAS.
Figure 18:
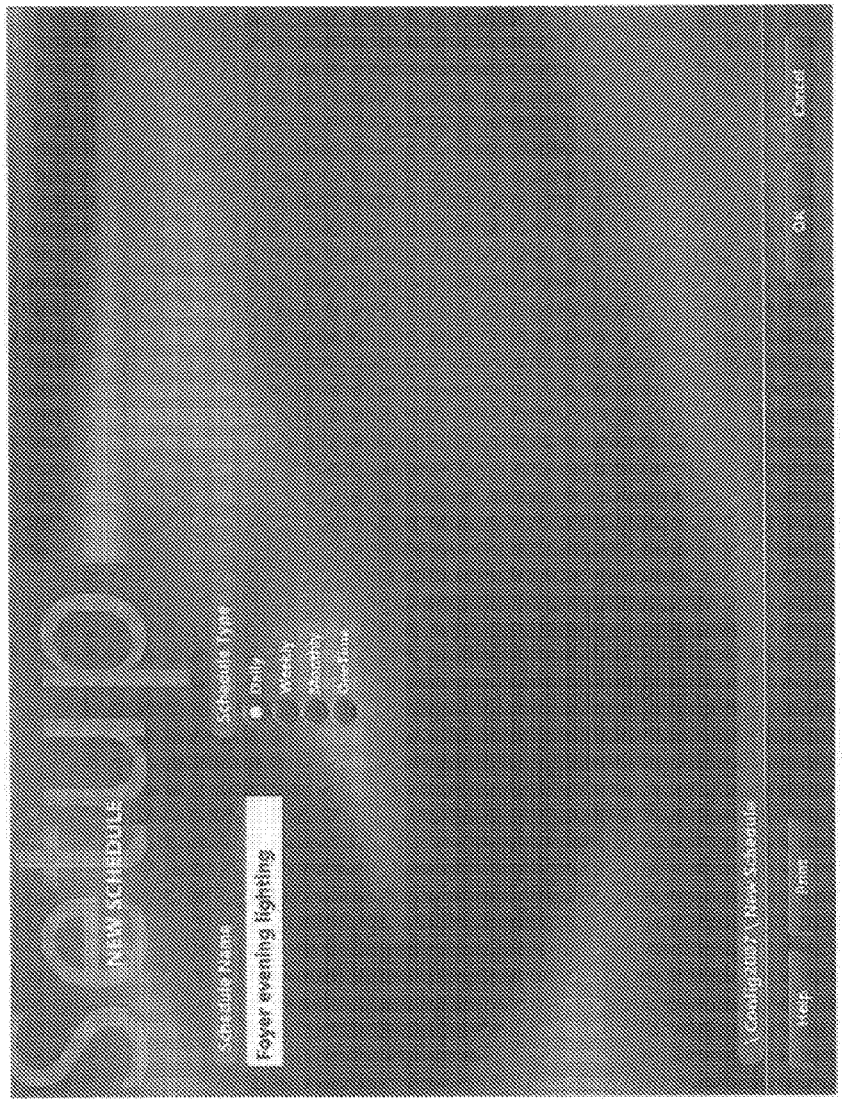
FIG. 18 shows a screen capture image of a new schedule menu screen of the configuration tool shown in FIG. 2.

In the CAS, schedules are time periods in which a script is to run. A schedule may consist of a schedule type (e.g., start time and date, or day) and an action (e.g., script to run). By using the configuration tool 40, one may add a schedule to any script that he or she creates at any time. It may be possible to have multiple schedules associated with the same script. Types of schedules may include: daily (i.e., schedule runs every day at the time specified), weekly (i.e., schedule runs one time a week on the specified day and at the time specified), monthly (i.e., schedule runs one time a month on the specified date and at the time specified), onetime (i.e., schedule runs one time only on the specified date and at time specified) and the like. FIG. 17 explains how a script and schedule are related. FIG. 18 shows a new schedule screen of the configuration tool 40 where one may select a schedule name and type for a new schedule. The configuration tool 40 may be used to edit an existing schedule, select a different script for a schedule, delete a schedule from a configuration and print a schedule report.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of client or device, and executed by a processor, for example a general-purpose processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A convergence and automation system (CAS), comprising:
    an Internet Protocol (IP) based network; and
    hardware comprising:
        a plurality of devices connected to the network to communicate with each other via the network, each device being configured to perform at least one operation;
        one or more sources, each source configured to provide data to at least one of the plurality of devices;
        at least one client connected to the network and configured to receive a user input related to configuration of the CAS, wherein the configuration comprises data on components, an association group, script commands, a menu, schedule and a trigger;
        a configuration tool integrated in the CAS and that resides on a service provider, the configuration tool generating a graphical user interface with a plurality of screens; and
        the service provider storing and executing instructions related to configuration of the hardware, the instructions comprising:
            instructions for operating the hardware according to a Web Service for Devices (WSD) protocol to enable communication among the plurality of devices and the at least one client via the network regardless of a difference thereamong in at least one of a proprietary language and communication protocol;

instructions for receiving a user input related to a configuration of the CAS; and instructions for configuring the CAS in accordance with the user input to the configuration tool, wherein the WSD protocol comprises:

a first communication layer configured to logically interface the at least one client;

a second communication layer configured to physically interface the plurality of devices; and a service provider layer comprising one or more components provided corresponding to one or more device categories, respectively, each component comprising at least one of the plurality of devices of the same device category, wherein each component comprises:

one or more Web Services provided corresponding to one or more of the plurality of devices of the corresponding device category, respectively, each Web Service configured to function as a Web Service host for the corresponding device;

one or more device bridges provided corresponding to the one or more Web Services, respectively, each device bridge configured to translate communication between the corresponding Web Service and device; and a controller configured to communicate with the one or more of the plurality of devices of the corresponding device category, wherein the instructions for configuring the CAS in accordance with the user input to the configuration tool comprise:

instructions for creating a configuration according to the WSD protocol;

instructions for loading a configuration according to the WSD protocol;

instructions for editing a configuration according to the WSD protocol;

instructions for saving a configuration according to the WSD protocol;

instructions for activating a configuration according to the WSD protocol;

instructions for recovering a configuration according to the WSD protocol; and instructions for deleting a configuration according to the WSD protocol;

wherein the instructions for editing the configuration comprise:

instructions for adding a trigger to the configuration, editing a trigger in the configuration, and deleting a trigger of the configuration;

instructions for creating a menu and editing a menu, the menu comprising at least one of a main menu, a room menu, a sub menu, a global menu and a Media Center Environment menu; and instructions for creating a schedule, editing a schedule and deleting a schedule, wherein the instructions for editing the schedule comprise instructions for selecting a script for the schedule.

2. The CAS of claim 1, wherein the instructions for configuring the CAS further comprise instructions for copying a configuration to the service provider.

3. The CAS system of claim 1, wherein the instructions for editing the configuration comprise at least one of:
instructions for adding a component to the configuration;
instructions for editing a component in the configuration; and
instructions for deleting a component from the configuration.

4. The CAS system of claim 3, wherein the instructions for editing the component comprise at least one of:
instructions for adding a zone to the component;
instructions for editing a zone in the component; and
instructions for deleting a zone of the component.

5. The CAS system of claim 4, wherein the one or more components comprise at least one of an audio component and a security component, and
the instructions for editing the component further comprise instructions for discovering a zone for at least one of the audio component and the security component.

6. The CAS system of claim 3, wherein the instructions for editing the configuration further comprise at least one of:
instructions for adding a source to the configuration;
instructions for changing a source in the configuration; and
instructions for deleting a source of the configuration.

7. The CAS system of claim 6, wherein the one or more components comprise an audio component, and
the instructions for editing the component comprises instructions for adding a source to the audio component.

8. The CAS system of claim 1, wherein the instructions for editing the configuration comprise at least one of:
instructions for adding a device to the configuration;
instructions for editing a device in the configuration; and
instructions for deleting a device of the configuration.

9. The CAS system of claim 1, wherein the instructions for editing the configuration comprise at least one of:
instructions for adding a control group to the configuration;
instructions for editing a control group in the configuration; and
instructions for deleting a control group of the configuration.

10. The CAS system of claim 1, wherein the instructions for editing the configuration comprise at least one of:
instructions for adding a device association group to the configuration;
instructions for editing a device association group in the configuration; and
instructions for deleting a device association group of the configuration.

11. The CAS system of claim 1, wherein the instructions further comprise instructions for discovering one or more devices.

12. The CAS system of claim 1, wherein the instructions for editing the configuration comprise at least one of:
instructions for adding a script to the configuration;
instructions for editing a script in the configuration; and
instructions for deleting a script of the configuration.

13. The CAS system of claim 12, wherein the script is a user-editable script.

14. A process for configuring a convergence and automation system (CAS) comprising hardware, the hardware comprising a plurality of devices, at least one source, at least one client and a service provider, wherein each device is connected to an Internet Protocol (IP) based network and configured to perform at least one operation, each source is configured to provide data to at least one of the plurality of devices, the least one client is connected to the network and configured to receive a user input related to configuration of the CAS, and the service provider stores and executes instructions related to configuration of the hardware, the process comprising:
operating the plurality of devices according to a Web Service for Devices (WSD) protocol to enable communication among the plurality of devices and the at least one client regardless of a difference thereamong in at least one of a proprietary language and communication protocol;

generating a configuration tool integrated in the CAS and that resides on a service provider, the configuration tool generating a graphical user interface with a plurality of screens;

receiving a user input related to configuration of the CAS with the configuration tool, wherein the configuration comprises data on components, an association group, script commands, a menu, schedule and a trigger; and configuring the CAS according to the user input received by the configuration tool, wherein the configuring the CAS comprises creating a configuration according to the WSD protocol, loading a configuration according to the WSD protocol, editing a configuration according to the WSD protocol, saving a configuration according to the WSD protocol, activating a configuration according to the WSD protocol, recovering a configuration according to the WSD protocol, and deleting a configuration according to the WSD protocol, and wherein the WSD protocol comprises:

a first communication layer configured to logically interface the at least one client;

a second communication layer configured to physically interface the plurality of devices; and a service provider layer comprising one or more components provided corresponding to one or more device categories, respectively, each component comprising at least one of the plurality of devices of the same device category, wherein each component comprises:

one or more Web Services provided corresponding to one or more of the plurality of devices of the corresponding device category, respectively, each Web Service configured to function as a Web Service host for the corresponding device;

one or more device bridges provided corresponding to the one or more Web Services, respectively, each device bridge configured to translate communication between the corresponding Web Service and device; and a controller configured to communicate with the one or more of the plurality of devices of the corresponding device category, wherein the editing the configuration with the configuration tool comprises:

adding a device to the configuration;

editing a device in the configuration; and deleting a device from the configuration;

wherein the editing the configuration comprises:

adding a trigger to the configuration, editing a trigger in the configuration and deleting a trigger of the configuration;

creating a menu and editing a menu; and creating a schedule, editing a schedule and deleting a schedule, wherein the editing the schedule comprises selecting a script for the schedule.

15. The process of claim 14, wherein the configuring the CAS comprises copying a configuration to a service provider.

16. The process of claim 14, wherein the editing the configuration comprises at least one of adding a component to the configuration;

editing a component in the configuration; and deleting a component of the configuration.

* * * * *